US012148042B2

(12) United States Patent
Brocato et al.

(10) Patent No.: US 12,148,042 B2
(45) Date of Patent: Nov. 19, 2024

(54) COMPUTER-BASED SYSTEMS OF MICROSERVICE ORCHESTRATION BASED ON BOUNDED CONTEXTS AND METHODS OF USE THEREOF

(71) Applicant: Capital One Services, LLC, McLean, VA (US)

(72) Inventors: Jim Brocato, McLean, VA (US); Alberto Silva, McLean, VA (US); Victor Lombardi, McLean, VA (US); Christopher Bowers, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/310,348

(22) Filed: May 1, 2023

(65) Prior Publication Data

US 2023/0267547 A1 Aug. 24, 2023

Related U.S. Application Data

(63) Continuation of application No. 17/375,773, filed on Jul. 14, 2021, now Pat. No. 11,651,435, which is a
(Continued)

(51) Int. Cl.
*G06Q 40/06* (2012.01)
*G06F 3/04842* (2022.01)
(Continued)

(52) U.S. Cl.
CPC ......... *G06Q 40/06* (2013.01); *G06F 3/04842* (2013.01); *G06F 9/451* (2018.02);
(Continued)

(58) Field of Classification Search
CPC ........ G06Q 40/06; G06Q 40/03; G06Q 50/16; G06F 9/451; G06F 9/543; G06F 3/04842
See application file for complete search history.

(56) References Cited

U.S. PATENT DOCUMENTS

| 5,774,879 A | * | 6/1998 | Custy | G06Q 40/02 358/1.11 |
| 9,983,860 B1 | | 5/2018 | Koty et al. | |

(Continued)

FOREIGN PATENT DOCUMENTS

| EP | 3160150 A1 * | 4/2017 | ............... G06F 3/01 |
| WO | 2016/070145 A1 | 5/2016 | |

OTHER PUBLICATIONS

International Search Report and Written Opinion from International Application No. PCT/US2021/030578 dated Aug. 3, 2021.
(Continued)

*Primary Examiner* — Scott C Anderson
(74) *Attorney, Agent, or Firm* — Greenberg Traurig, LLP

(57) ABSTRACT

In order to provide agile and dynamic portfolio management, systems and methods for underwriting and portfolio management include an ecosystem including a platform, including processing devices, communication interfaces, runtime environments, and databases, where the databases are configured to store ecosystem data, where the ecosystem data includes data associated with a plurality of systems. A service layer is in communication with the platform, the service layer including containers executed in the runtime environment and configured to implement microservices, where each of the containers include: at least one microservice and a datastore device configured to store domain-specific data. An orchestrator is in communication with the service layer, the orchestrator to schedule execution of the microservices according to bounded contexts coordinated
(Continued)

with composite application programming interfaces (API) interfacing with a microservice specific API.

20 Claims, 17 Drawing Sheets

Related U.S. Application Data continuation of application No. 16/867,231, filed on May 5, 2020, now Pat. No. 11,127,080.

(51) Int. Cl.
  *G06F 9/451* (2018.01)
  *G06F 9/54* (2006.01)
  *G06Q 40/03* (2023.01)
  *G06Q 50/16* (2012.01)
(52) U.S. Cl.
  CPC .............. *G06F 9/543* (2013.01); *G06Q 40/03* (2023.01); *G06Q 50/16* (2013.01)

(56) References Cited

U.S. PATENT DOCUMENTS

| | | | |
|---|---|---|---|
| 10,445,043 B2 * | 10/2019 | Begeman | G06F 9/451 |
| 10,474,506 B1 | 11/2019 | Gray et al. | |
| 10,599,390 B1 | 3/2020 | Brahmbhatt | |
| 2012/0254011 A1 * | 10/2012 | Studnitzer | G06Q 40/03 |
| | | | 705/37 |
| 2016/0132808 A1 | 5/2016 | To et al. | |
| 2017/0116669 A1 | 4/2017 | Wickstrom et al. | |
| 2017/0236148 A1 | 8/2017 | James et al. | |
| 2018/0095772 A1 * | 4/2018 | Wu | G06F 16/00 |
| 2018/0321796 A1 | 11/2018 | Kattamanchi et al. | |
| 2019/0012249 A1 | 1/2019 | Mercuri et al. | |
| 2020/0111165 A1 | 4/2020 | Kumar et al. | |
| 2020/0151315 A1 * | 5/2020 | Lee | G06F 3/04842 |

OTHER PUBLICATIONS

Supplementary European Search Report from European Patent Application No. 21800419.0 dated Jan. 29, 2024.
De la Torre, "Asynchronous message-based communication," Sep. 20, 2018, pp. 1-346.

* cited by examiner

| UI Components | Composite APIs | Domain APIs |
|---|---|---|
| Customer Detail<br>Customer Financials<br>Capital Structure<br>Enterprise Valuation<br>Covenants<br><br>Deals<br>Deal Financials<br>Covenants<br><br>Collateral Detail<br>Collateral Financials<br>Rent Roll<br><br>Financial Spreading<br>Real Estate Financials<br>Commentary | Customer<br>Customer<br>Customer Financials<br>Capital Structure<br>Enterprise Valuation<br>Covenants<br><br>Deals<br>Deals<br>Deal Financials<br><br>Collaterals<br>Collateral Detail<br>Collateral Financials<br>Rent Roll<br><br>Facilities<br>Facility Details<br>Facility Operations<br><br>Shared<br>User<br>Financial Spreading<br>Real Estate Financials<br>Commentary | Enterprise Valuations<br>Capital Structure<br>Collateral Financials<br>Customer Financials<br>Liquidation Analysis<br>Watched and Criticized (WAC)<br>Covenants<br>Deals<br>Deals Financials<br>Facilities<br>Commentary<br>User<br>Collateral<br>Customer<br>Approvals<br>Risk Rating |

FIG. 5A

COMPUTER-BASED SYSTEMS OF MICROSERVICE ORCHESTRATION BASED ON BOUNDED CONTEXTS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of providing capabilities related to microservice orchestration based on bounded contexts and methods of use thereof, such as, but not limited to, complex and multi-faceted systems.

BACKGROUND OF TECHNOLOGY

A computer network platform/system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users.

Typically, commercial banking processes are characterized by manual processes, either by pen and paper, or into spreadsheets to be uploaded to a database. To the extent digitized products are available, the products have awkward interfaces and large, monolithic implementations that are difficult to update.

SUMMARY OF DESCRIBED SUBJECT MATTER

In some embodiments, the present disclosure provides another exemplary technically improved computer-based method that includes at least the following steps of receiving, by at least one processor, at least one composite application programming interface (API) command associated with a user interface (UI) selection for a context of a portfolio management UI in a portfolio management application, where the context of the portfolio management UI includes a collection of context-specific UI components for presenting context-specific data associated with an associated collection of portfolio management tasks of at least one portfolio management stage of a plurality of portfolio management stages in the portfolio management application, and where the collection of portfolio management tasks includes a selection from a plurality of portfolio management tasks of the plurality of portfolio management stages based on the at least one composite API command. A further step includes generating, by the at least one processor, UI component structures based on the at least one composite API command for presenting the context-specific resources. A further step includes generating, by the at least one processor, a set of domain API commands associated with each composite API command of the at least one composite API command, where the set of domain API commands include a plurality of microservice-specific API commands for invoking the collection of portfolio management tasks using a respective collection of portfolio management microservices of a plurality of portfolio management microservices, and where the plurality of portfolio management microservices are configured to generate the context-specific resources according to the plurality of portfolio management tasks. Further steps include receiving, by the at least one processor, in response to each respective domain API command of the set of domain API commands, the context-specific data from the respective collection of portfolio management microservices to populate the collection of context-specific UI components according to the at least one portfolio management stage of the context of the portfolio management UI, generating, by the at least one processor, a context-specific portfolio visualization associated with the context of portfolio management based on the context-specific resources of the collection of context-specific UI components, and causing to display, by the at least one processor, the portfolio visualization with the selected user interface component of the portfolio management user interface by at least one computing device associated with at least one user.

In some embodiments, the present disclosure provides another exemplary technically improved computer-based method that includes at least the following steps of receiving, by at least one processor, a user interface (UI) selection including a selected user interface component of a portfolio management user interface, where the context of the portfolio management UI includes a collection of context-specific UI components for presenting context-specific data associated with an associated collection of portfolio management tasks of at least one portfolio management stage of a plurality of portfolio management stages in the portfolio management application. A further step includes generating, by at least one processor, at least one composite application programming interface (API) command associated with the UI selection for a context of a portfolio management UI, where the collection of portfolio management tasks includes a selection from a plurality of portfolio management tasks of the plurality of portfolio management stages based on the at least one composite API command. Further steps include generating, by the at least one processor, UI component structures based on the at least one composite API command, and communicating, by the at least one processor, the at least one composite API command to a portfolio management processing system, where the portfolio management processing system generates a set of domain API commands associated with each composite API command of the at least one composite API command, where the set of domain API commands include a plurality of microservice-specific API commands for invoking the collection of portfolio management tasks using a respective collection of portfolio management microservices of a plurality of portfolio management microservices, and where the plurality of portfolio management microservices are configured to generate the context-specific resources according to the plurality of portfolio management tasks. A further step includes receiving, by the at least one processor, in response to each respective domain API command of the set of domain API commands, the context-specific data from the respective collection of portfolio management microservices to populate the collection of context-specific UI components according to the at least one portfolio management stage of the context of the portfolio management UI. Further steps include generating, by the at least one processor, a context-specific portfolio visualization associated with the context of portfolio management based on the context-specific resources of the collection of context-specific UI components, and causing to display, by the at least one processor, the portfolio visualization with the selected user interface component of the portfolio management user interface by at least one computing device associated with at least one user.

In some embodiments, the present disclosure provides an exemplary technically improved computer-based system that includes at least the following components of at least one processor. The at least one processor is configured to execute software instructions causing the at least one processor to perform steps to receive at least one composite application programming interface (API) command associated with a user interface (UI) selection for a context of a portfolio management UI in a portfolio management application, where the context of the portfolio management UI includes a collection of context-specific UI components for presenting context-specific data associated with an associated collection of portfolio management tasks of at least one portfolio management stage of a plurality of portfolio management stages in the portfolio management application, and where the collection of portfolio management tasks includes a selection from a plurality of portfolio management tasks of the plurality of portfolio management stages based on the at least one composite API command. The at least one processor further performs steps to generate UI component structures based on the at least one composite API command for presenting the context-specific resources, and generate a set of domain API commands associated with each composite API command of the at least one composite API command, where the set of domain API commands include a plurality of microservice-specific API commands for invoking the collection of portfolio management tasks using a respective collection of portfolio management microservices of a plurality of portfolio management microservices, and where the plurality of portfolio management microservices are configured to generate the context-specific resources according to the plurality of portfolio management tasks. The at least one processor further performs steps to receive in response to each respective domain API command of the set of domain API commands, the context-specific data from the respective collection of portfolio management microservices to populate the collection of context-specific UI components according to the at least one portfolio management stage of the context of the portfolio management UI, generate a context-specific portfolio visualization associated with the context of portfolio management based on the context-specific resources of the collection of context-specific UI components, and cause to display the portfolio visualization with the selected user interface component of the portfolio management user interface by at least one computing device associated with at least one user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
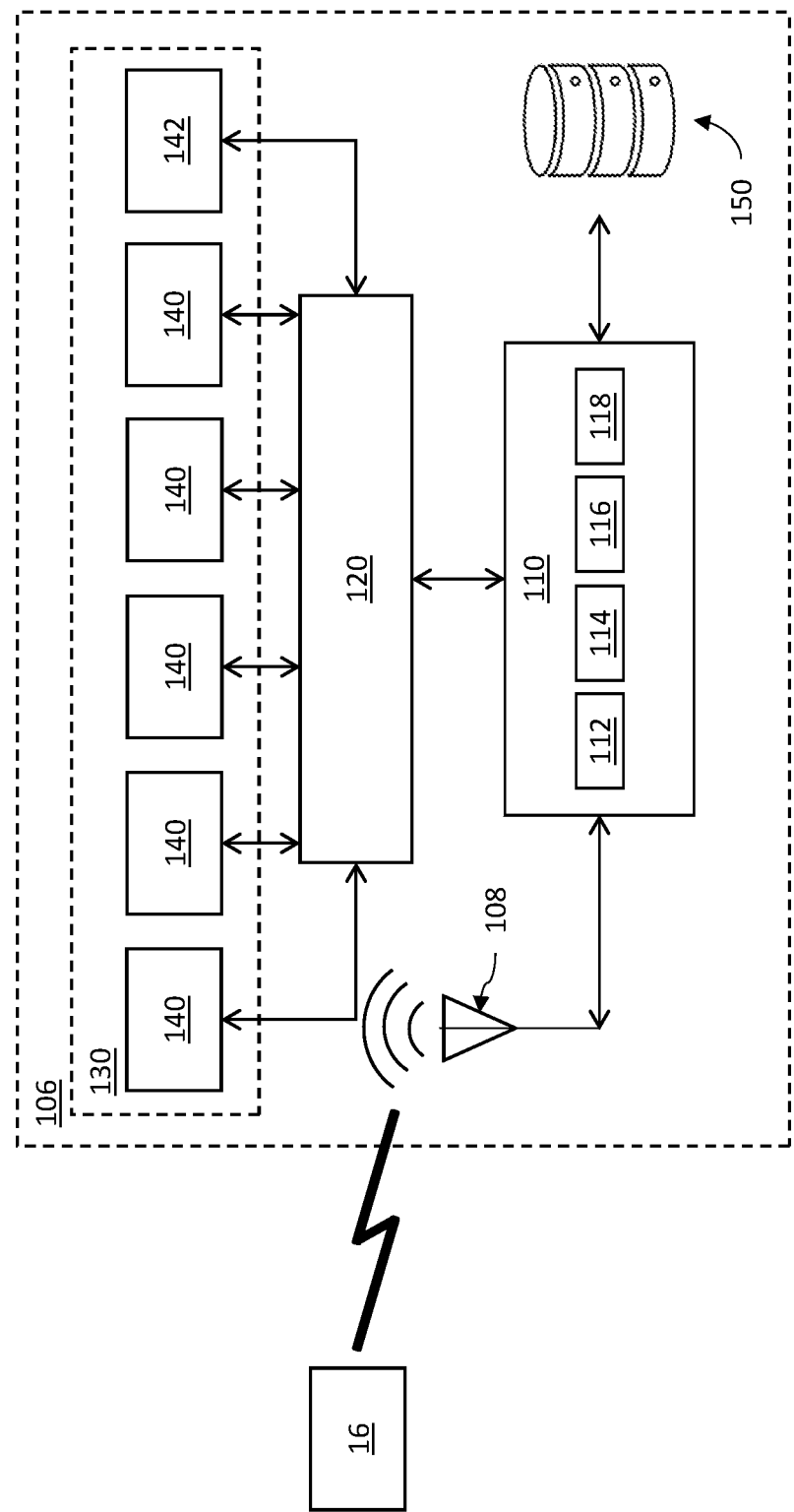
FIGS. 1-12 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk(™), TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems of the present disclosure may include or be incorporated, partially or entirely, into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-9,999,999,999), and so on.

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH),WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, a "financial instrument" refers to an equity ownership, debt or credit, typically in relation to a corporate or governmental entity, where the financial instrument is typically traded via one or more financial trading venues. Some examples of "financial instruments" can include, but are not limited to, stocks, bonds, commodities, swaps, futures, and currency.

In some embodiments, exemplary inventive computer-based systems of the present disclosure may be configured to operate as an intermediate in matching broker(s) and aggregator(s) of liquidity on one or more of exchange-like venue (e.g., NYSE, CME) and/or one or more of off-exchange-like venue (e.g., dark pool). In some embodiments, the instant inventive platform can aggregates/receives quotes, also called "indications of interest" (IOI) by various means (e.g., smartphone, Internet, specialized computer interface, etc.).

FIGS. 1 through 8 illustrate systems and methods of orchestration of an ecosystem of bounded context services for the digitization, automation and management of financial underwriting and financial portfolios. The following embodiments provide technical solutions and/or technical improvements that overcome technical problems, drawbacks and/or deficiencies in the technical fields involving microservice bundling and intercommunication within and across domains, orchestration of microservice functionality according to bounded contexts including microservices therein, and efficient interaction with end users. As explained in more detail, below, technical solutions and/or technical improvements herein include aspects of improved operation of microservices through organization by domain in bounded contexts, including shared data resources within domains, improved orchestration leveraging bounded contexts, and improved user interaction for complex, multi-component applications such as financial underwriting and portfolio management leveraging bounded contexts and automated functionality according to microservice implementations. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of another exemplary computer-based system for underwriting and portfolio management in accordance with one or more embodiments of the present disclosure.

Embodiments of the present invention include an ecosystem 106 for portfolio management, from origination through closure of an account. However, principles of the present invention are not limited to portfolio management. Aspects of the present invention can be applied to any embodiment for the orchestration of microservices within a multitude of bounded contexts for the service of information and interactive content to a user via a lean user interface (UI). For example, embodiments of the present invention include the ecosystem 106 implemented with, e.g., one or more network servers, such as the network servers 306 described below.

In an embodiment, the ecosystem 106 includes a multi-layered architecture including, for example, a service layer 130, an orchestrator 120 and a platform layer 110, however other layers are additionally contemplated. In embodiments, a user may interact with the ecosystem 106 with a user device 16. Communications from the user device 16 can be received by a transceiver 108 and then be routed, using, e.g., the platform layer 110 to an appropriate component of the system.

In embodiments, the platform layer 110 can include base shared functionality for the ecosystem 106 on the whole. For example, the platform layer 110 can include an input/output (I/O) interface 112 for facilitating data communication to external devices, such as, e.g., the transceiver 108, a database 150, among other devices. The platform layer 110 may also include a runtime environment 114 for implementing programs, services, functionalities and microservices using one or more processing device 116 and memory devices 118. The memory devices 118 can include, e.g., temporary storage and caching for, e.g., logging fault and error reports, configuration files, state information, among other temporary and permanent data to facilitate resources of the ecosystem 106. In some embodiments, the platform layer 110 includes functionality for, e.g., configuration management, logging and monitoring of data traffic, document management, communication routing, notifications, messaging tools, reporting tools, as well as any other functions pertaining to platform level functionality.

In some embodiments, a request from the user device 16 can be routed to the orchestrator 120. In an embodiment, the orchestrator 120 manages operations of the ecosystem 106, including allocation of resources, process schedule with, e.g., the processing devices 116, among other tasks. For example, in some embodiments, the orchestrator 120 includes application programming interfaces (APIs) for calling services and functions of the ecosystem 106 for delivery to the user device 16.

In an embodiment, the orchestrator 120 manages operations of microservices in a service layer 130 and coordination of the service layer 130 with the platform layer 110. For example, the service layer 130 can include bounded contexts 140 with microservices related to, e.g., a particular domain, such as a particular business domain, credit portfolio domain, or other domain. In some embodiments, orchestrator 120 manages operations by abstracting the domain and shared services APIs from the clients. In some embodiments, the orchestrator 120 further facilitates aggregation of data from multiple domains in the service layer 130 and/or orchestrates data-related operations across domains and services to provide for complete experiences within any given domain. For example, the "Covenant Measurement" experience will involve orchestrating data from the Covenant Domain, the Customer domain, and the Approvals Service in order to form the end to end experience.

In some embodiments, the service layer 130 may also include shared microservices 142 that include functionality that can be shared across multiple domains. Therefore, in embodiments, the orchestrator 120 can manage the data flow and the execution of microservices via the bounded contexts 140 such that data can be shared, processed, and returned to the user device 16. For example, the user device 16 may communicate a request, e.g., a user interaction via a component based UI of the user device 16. The request can be received by the transceiver 108 and routed via the platform layer 110 to the orchestrator 120. The orchestrator 120 may then interface with the user device 16 by analyzing the request. Upon analysis, the orchestrator 120 may determine that the request calls, e.g., an application programming interface (API) implemented by the orchestrator 120 that is associated with a particular bounded context 140 of the service layer 130. In some embodiments, the user interaction can be input via a component of the component based UI that corresponds to this particular bounded context 140. Thus, the orchestrator 120 recognizes the request as calling a bounded context 140 via the appropriate API, such as a representation state transfer (REST) API. The orchestrator 120 may then manage the microservices of the appropriate bounded context 140 according to the request via the API.

In some embodiments, the request can call multiple APIs. In the same or other embodiments, the request can call an API that triggers more than one bounded context 140 and/or the associated bounded context 140 with shared microservices 142. Depending on a resource availability and states of each of the requested microservices, the orchestrator 120 may schedule and prioritize microservices of the appropriate bounded contexts 140 to respond to the request from the user device 16. Thus, the orchestrator 120 may prioritize micro service implementation on the processing device 116 and memory 118 of the platform layer 110, instantiation of the microservices in the runtime environment 114, data flow between the bounded context 140 and the shared microservices 142, and any data access requirements to the database 150. Thus, the orchestrator manages the implementation of the microservices by coordinating the appropriate bounded context 140 called by the API, recognizes dependencies on shared microservices 142 and data in the memory 118 and database 150, and orchestrates a task schedule corresponding to the microservices of the bounded context 140 to efficiently and effectively respond to the request from the user device 16. Moreover, the orchestrator 120 may also facilitate security and modularity by intentionally prevent leaking data and logic across domains, thus preserving reuse and extensibility.

In some embodiments, the bounded contexts 140 of the service layer 130 can include logic associated with, e.g., a particular business domain of a credit underwriting and portfolio management ecosystem. For example, business domains can include, e.g., asset management, deals and negotiation management and implementation, facility management, pricing analysis, legal and credit entity management, underwriting management and analysis, among other domains associated with the management of a credit portfolio of a credit service entity. Each of the business domains can have an associated bounded context 140 with functionality for automating and digitizing processes related to the respective business domain. For example, an asset management domain can have an asset management bounded context 140 with microservices included therein for each of, e.g., a microservice with a repository of digitized assets, a microservice for automation of document generation based on client and credit information, among other related functions of asset management. As another example, a pricing domain can have an associated pricing bounded context 140 with microservices to implement each of the functions of, e.g., price modelling, return on equity (ROE) analysis, service costs, among others. In some embodiments, the service layer 130 includes an underwriting bounded context 140 associated with the domain of commercial credit underwriting. The underwriting bounded context 140 can include microservices for each of the capabilities of, e.g., assessment of a client's ability to repay loans, automatic pre-population of underwriting analysis data for both internal and external use, workflow generation for improved collaboration across departments to facilitate deal structuring and review, among other underwriting functions. Each of the functions of a domain can have an associated microservice in the bounded context 140 of the respective domain. However, some microservices may perform multiple of the functions and some functions can be split across multiple microservices. Other embodiments are also contemplated where suitable microservice organizations are implemented within each bounded context 140 associated with an aspect of the underwriting and portfolio management processes.

In some embodiments, some of the bounded contexts 140 implement similar functions. To facilitate efficient resource use and system maintenance, functions that are duplicated across multiple bounded contexts 140 can be separated into stand-alone shared microservices 142. For example, employee information, coverage options, credit event tracking, approval tracking, among other functions, may be utilized by multiple different bounded contexts 140. Thus, in an embodiment, each of the employee information, coverage options, credit event tracking, approval tracking, and other functions are independent from the bounded contexts 140. The orchestrator 120 may then instantiate a bounded context 140 in response to an API call in a request, recognize dependencies on functions of shared microservices 142, and schedule tasks associated with the appropriate shared microservices 142 such that tasks of the called bounded context 140 can be scheduled with dependencies on the shared microservices 142 satisfied.

The orchestrator 120 can schedule appropriate tasks in response to a request from the user device 16, as described above, and orchestrate a response upon completion of the tasks associated with the requested domain functionality. The response can be returned to the user device 16 via the platform layer 110 routing and the transceiver 108 to cause the response to be displayed in the appropriate component on the user device 16. Thus, in embodiments, the underwriting and portfolio management ecosystem can be automated and digitized in the ecosystem 106 through an efficient architecture including the organization of microservices according to the domain of respective functionalities. A lean user experience can be created that facilitates efficient interaction by a user at a user device 16, such that the orchestrator 120 can quickly and efficiently analyze a received request from the user device 16 to instantiate the appropriate bounded context 140 and determine microservice scheduling based on the bounded context 140 and any appropriate shared microservices 142 associated with the component of the UI of the user device 16.

Figure 2:
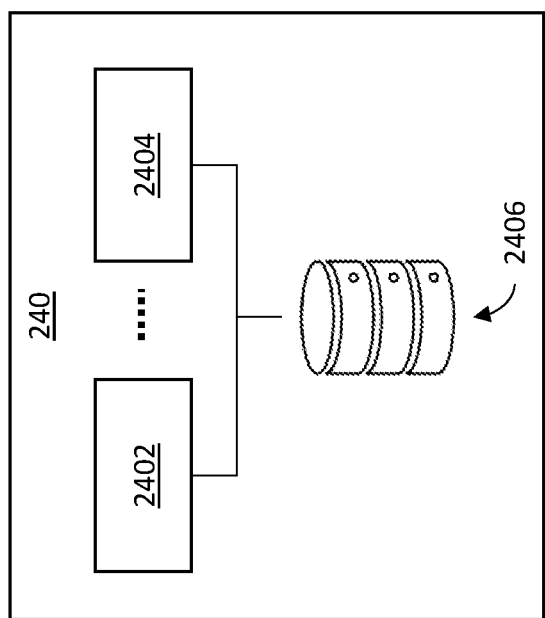

FIG. 2 is a block diagram of another exemplary computer-based system with microservices organized by bounded contexts for underwriting and portfolio management in accordance with one or more embodiments of the present disclosure.

As described above, embodiments of an exemplary inventive ecosystem 106 include a service layer 130 having bounded contexts 240 associated with respective business domains in, e.g., the commercial credit underwriting and portfolio management processes. In embodiments, the bounded context 240 can include logic associated with, e.g., a particular business domain of a credit underwriting and portfolio management ecosystem. For example, business domains can include, e.g., asset management, deals and negotiation management and implementation, facility management, pricing analysis, legal and credit entity management, underwriting management and analysis, among other domains associated with the management of a credit portfolio of a credit service entity.

In some embodiments, the bounded context 240 may communicate with other bounded contexts, e.g., asynchronously across a message bus. Thus, the domain of the bounded contexts 240 may share events with another domain without the two domains being tightly coupled. For example, this architecture allows for one domain to process a customer's financial statements, and upon completion broadcast a notification message, and another domain picks up on that message and automatically reruns a risk rating.

In some embodiments, a bounded context 240 may include multiple microservices 2402 through 2404, which can be any number of microservices 2402-2404 according to a number of functions and/or processes associated with the domain of the bounded context 240. For example, for a bounded context 240 associated with the domain of underwriting, there can be a microservice 2402 for analyzing a client's ability to repay loans, another microservice 2404 for automatically pre-populating underwriting analysis data, and additional microservices (not shown) for, e.g., generating workflows for optimizing the underwriting of a particular client, among other microservices corresponding to domain functions.

In embodiments, the microservices 2402-2404 can be independently maintained from each other. Rather than a single monolithic service within the service layer 130 for all ecosystem 106 functions, and even within each bounded context 240, the microservices 2402-2404 facilitate splitting the functionality across a suite of component services. Each component service, embodied in a respective microservice, can be implemented in different programming languages, managed by different teams, deployed and scaled independently, et cetera. Such an arrangement modularizes the tasks of each bounded context 240 to facilitate continuous integration and continuous development because one microservice, e.g., microservice 2402, can be updated without affected another microservice, e.g., microservice 2404. Further, the microservices 2402-2404 can be easily orchestrated, e.g., by an orchestrator 120 as described above, via the orchestration of APIs calling each microservices. Thus, embodiments of the present invention include an agile architecture for underwriting and portfolio management that does not require any single centralized server to store and maintain a monolithic program. Rather, the bounded contexts 240 and associated microservices 2402-2404 can be distributed across, e.g., a cloud or decentralized computing network.

In embodiments, each microservice 2402-2404 can be instantiated in an independent container or sandbox, such as, e.g., with a virtual machine or by software defined zones within, e.g., the runtime environment 114. Alternatively, each bounded context 340 can define a container in which associated microservices 2402-2404 may run. Other configurations, however, are also contemplated. Thus, in embodiments, each microservice 2402-2404 can be securely and independently implemented to perform tasks and processes for carrying out a business domain function.

In embodiments, to facilitate efficient interoperability of each microservice 2402-2404 in the bounded context 240, the microservices 2403-2404 can share data associated with the domain of the bounded context 240 using, e.g., a common shared storage 2406. The shared storage 2406 may include a repository of any data relevant to the business domain of the bounded context 240. For example, for the domain of underwriting, the shared storage 2406 can include, e.g., shared libraries, client data, client risk, workflow templates, deals, among other underwriting data. Thus, data utilized by one microservice, e.g., microservice 2402, can be accessed and/or edited in the shared storage 2406 for use by subsequent microservices, e.g., microservice 2404. Thus, all data needed to perform, e.g., underwriting, or any other domain, is present locally in shared storage 2406 in the bounded context 240 with the relevant microservices 2402-2404.

Figure 3:
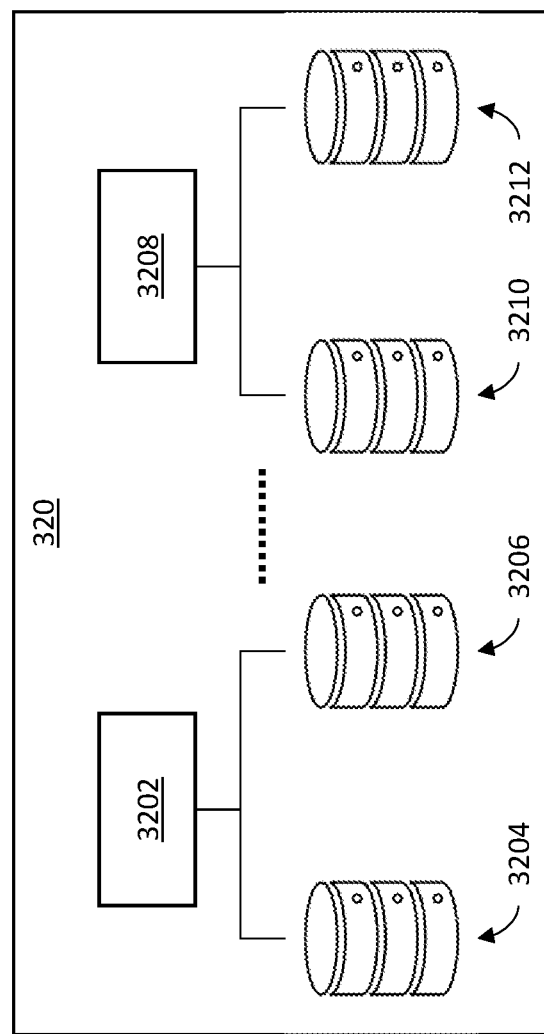

FIG. 3 is a block diagram of another exemplary computer-based system with an orchestrator of microservices organized by bounded contexts for underwriting and portfolio management in accordance with one or more embodiments of the present disclosure.

As described above, embodiments of an exemplary inventive ecosystem 106 can include an orchestrator 320, such as the orchestrator 120 described above that orchestrates bounded contexts 140 and microservices included therein according through, e.g., API orchestration. Thus, in embodiments, the orchestrator 320 may include multiple APIs 3202 through 3208, such as, e.g., representational state transfer (REST) APIs. In an embodiment, upon being called in a request, e.g., from a user device or other microservice, each API 3202-3208 interfaces with a bounded context, such as the bounded contexts 140 described above. The called API 3202-3208 may then receive and transfer data produced by the called bounded context 140 back to the platform layer for routing, such as, e.g., back to a user device.

Figure 4:
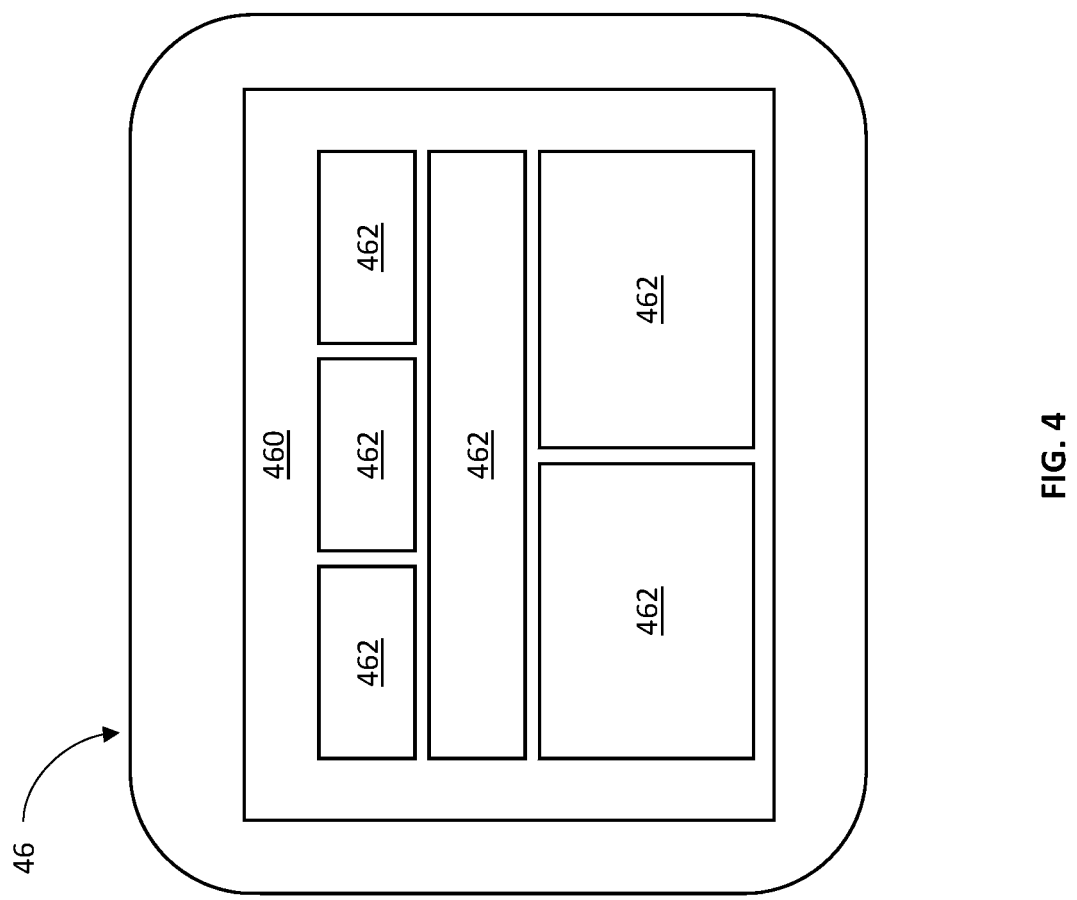

In embodiments, each API 3202-3208 can be accompanied by an associated cache 3204 and 3210 and/or façade pattern 3206 and 3212 for presenting data to the associated microservices and to the associated component of the component based UI. For example, an API 3202 and/or 3208 may include a façade pattern 3206 and/or 3212 stored on a memory device. The API 3202 may include complex code for interfacing with one or more microservices of a bounded context 340. Such a complex arrangement can make calling and using an API 3202 with a large library, e.g., stored in cache 3204. The façade pattern 3206 can provide a more simplified interface for a request to engage with the API 3202. Thus, operation of the orchestrator 320 can be simplified with the façade patterns 3206 and/or 3212 with a more simplified interface to the APIs 3202-3208. In some embodiments, the cache 3204/3210 and the façade ade patterns 3206/3212 may include, e.g., memory or storage device, such as a database, partition of a database, cloud storage, hard drive, solid state drive, flash memory, random access memory (RAM), or other storage device. Additionally, in embodiments, the cache 3204/3210 and the façade patterns 3206/3212 may include data for display in a user interface (UI), such as, e.g., a component based UI, with each component corresponding to a bounded context for a portion of the origination/underwriting/portfolio management process FIG. 4 is a block diagram of another exemplary computer-based system user interface having components for bounded contexts of underwriting and portfolio management in accordance with one or more embodiments of the present disclosure.

In some embodiments of an exemplary inventive ecosystem, a user device 46 may interface with business domains, e.g., microservices structured together in bounded contexts as described above. To facilitate a lean and efficient user experience, the user device 46 may include a user interface 460 have multiple components 462.

According to embodiments, each component 462 may be associated with a respective business context. As a result, the user interface 460 of the user device 46 may be configured to interface with separate bounded contexts via distinct components 462. Thus, a user can interact with a particular component 462 to interact with the associated bounded context for a domain of the, e.g., underwriting and portfolio management process. Taking action, e.g., pressing a button, selecting a data filter, or entering information, among other actions, in the component 462 can cause the user device 46 to communicate a request to the ecosystem to execute the action with the respective bounded context. The results of executing the action can then be returned to the component 462 to be viewed by the user.

In some embodiments, the user interface 460 can include components 462 for, e.g., deal management, pricing analysis, asset management, workflow and portfolio management, task management with notifications, communication and collaboration tools, client management, and client account access, among other domains of the underwriting and portfolio management process. For example, the user interface 460 can be tailored for an associate for management of the commercial credit portfolio by, e.g., including components 462 for deal management having tools for viewing and interacting with deal details, pricing analysis with tools for underwriting and origination, workflow management with tools for viewing portfolios with multiple exposure filters such as by industry, segment, geography, risk level, covenants, collateral and financial trends, overlaid external data, among other filters, a property details, a notifications components for view and interacting with a task manager, a client relationship component for viewing and interacting with exposure, ratings, strategic plans, tracking loans, financials and collateral, real-time risk ratings and probability of default and related news, among other components 462 for associated bounded contexts such as those described above. Similarly, in some embodiments, the user interface 460 may also be tailored for clients to include components for self-service, account management, alerts and workflow, account details, payments, cash advances requests, refinance and renewal requests, among other domains of client interaction in commercial credit management.

In embodiments, each component 462 can be configured specifically for a bounded context such that the components 462 have user interface elements and interaction modalities appropriate for the domain of the respective bounded context. Each component 462 may be configured with input tools as well as visualization tools to organize data received from the bounded context of that component 462, including, e.g., visualization logic for formatting and organizing raw data, such as, e.g., transaction filters, asset portfolio filters, filters for view trends in credit score, credit risk, investment, payment, asset and other information of clients. Alternatively, in some embodiments, visualization tools can be communicated to the components 462 form the bounded contexts along with the data being visualized. Therefore, in an embodiment, the user device 46 can be more simply and efficiently managed with a lean user interface 460 that requires minimal logic to implement. For example, in an embodiment, the user interface 460 may be a web application accessed via a browser. However, in other embodiments, the user interface 460 may be a native application or hybrid native-web app.

FIG. 5A-5D illustrates a front-end design for a component-based user interface for displaying UI components effectuated with APIs interfacing with bounded contexts in accordance with one or more embodiments of the present disclosure.

In some embodiments, a component based user interface (e.g., user interface 460 described above) may including multiple UI components (e.g., components 462) configured to display information relevant to a given context. Front-end components consume domain data through a composite API layer removing dependencies between UI components 462 and the domain microservices of bounded contexts (e.g., bounded contexts 140 or 240 with microservices 2402-2404). These APIs may include, e.g., a global branding and design system composite API generators which are based on, e.g., a component based web hosting framework. The use of global branding and design system generators may encourage common implementations for security, authorization, logging, and other crosscutting concerns while allowing for future flexibility as the user interface 460 and domain service layers 130 continue to evolve.

For example, the UI components 462 can include a "customer" context can include UI components for each of "Customer Detail", "Customer Financials", "Capital Structure", "Facilities", "Enterprise Valuation" and "Covenants."

Similarly, in another example, the UI components 462 can include a "Deals" context can include UI components for each of "Deal Details", "Deal Financials", and "Covenants".

In another example, the UI components 462 can include a "Collaterals" context can include UI components for each of "Collateral Detail", "Collateral Financials", "Rent Rolls", "Facilities", "Enterprise Valuation" and "Covenants."

In some embodiments, each of the customer, deals and collaterals contexts can include UI components for services including, e.g., "Real Estate Financials Module", "Financial Spreading Module" and "Commentary" to show data associated with Real Estate Financials Analysis Module, Financial Spreading Valuations and Commentary Module that may obtain and/or receive commentary such as third-party commentary and/or user commentary.

In some embodiments, a UI component can be provided with data using a combination of composite APIs and domain APIs. In some embodiments, the UI components can communicate with a hub, such as the ecosystem 106 and orchestrator 120, that serves data from bounded contexts (e.g., bounded contexts 140/240 with microservices 2402-2404 therein) by making requests with the composite APIs to domain APIs, which in turn request data from the associated microservices. Accordingly, the composite APIs provide an additional layer to match and combine domain APIs for each UI component, thus improving the flexibility of the component-based user-interface.

Figure 5B:
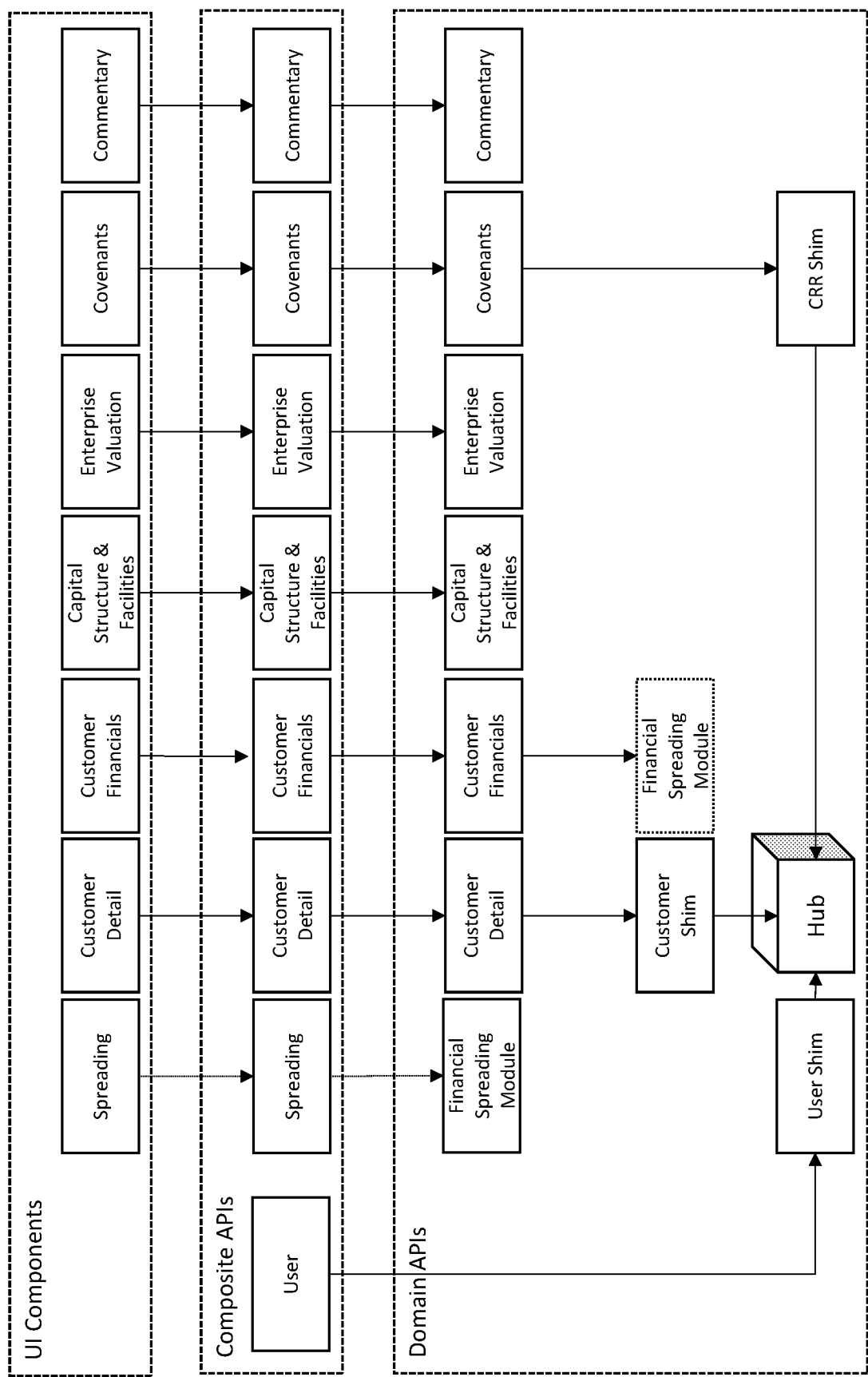
Figure 5C:
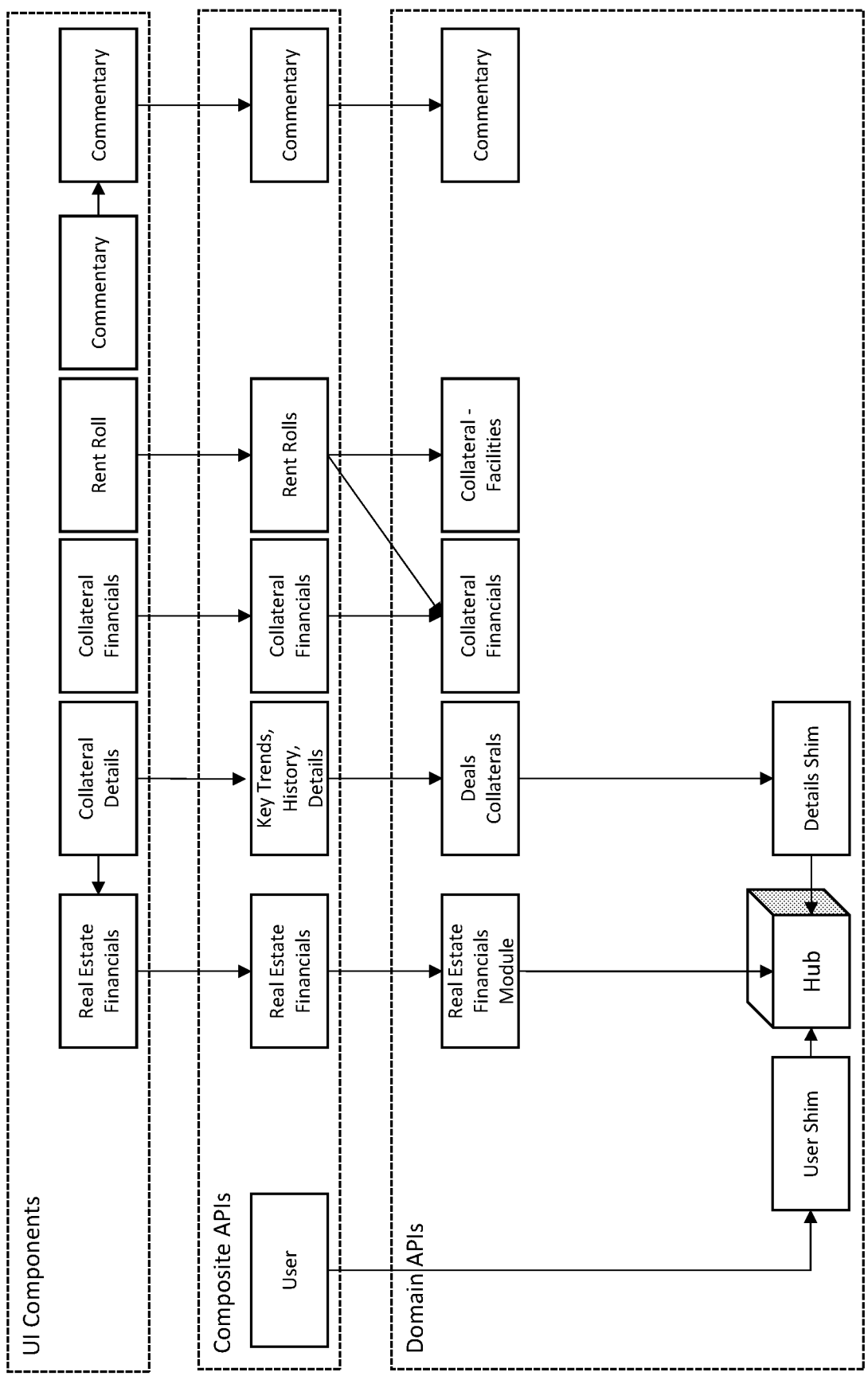
Figure 5D:
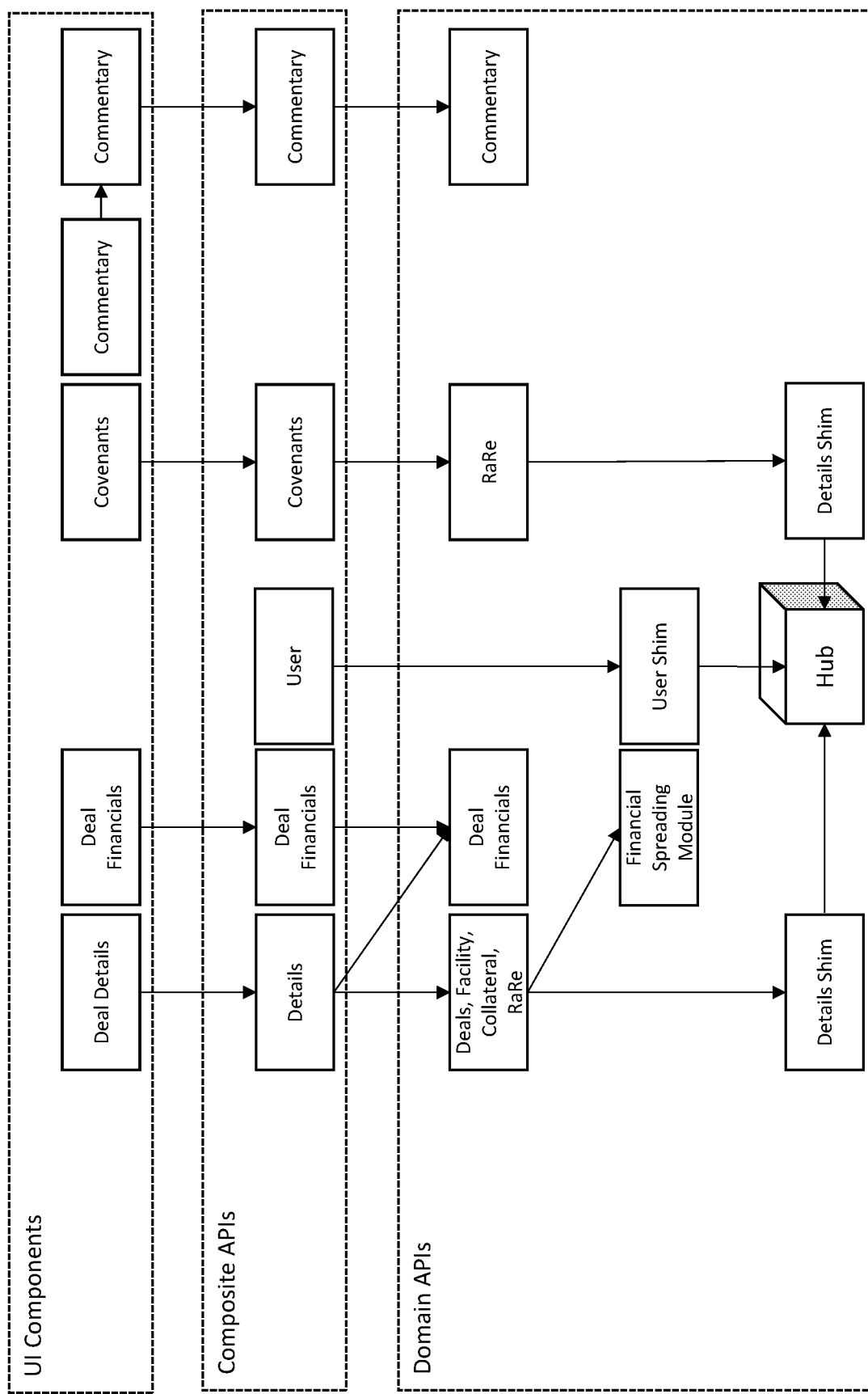

For example, FIG. 5B illustrates the coordination of communication from the UI components to the hub via a component API layer coordinating a domain API layer in the customer context. Similarly, FIG. 5C illustrates the coordination of communication from the UI components to the hub via a component API layer coordinating a domain API layer in the deals context, and FIG. 5C illustrates the coordination of communication from the UI components to the hub via a component API layer coordinating a domain API layer in the collateral context.

In some embodiments, some UI contexts or microsites, including collections of UI components as described above may include information from common services. For example, Financial Spreading ratings and Real Estate Financials reports may be relevant to multiple contexts. To avoid duplication, thus improving efficiency, such services may be provided via shared APIs at the composite API level. For example, FIG. 5B illustrating the customer context depicts a Financial Spreading UI component communicating with the Financial Spreading Module via a Financial Spreading API in the composite API layer rather than with the hub or via an additional API.

Additionally, in some embodiments, the composite APIs may be used to aggregate multiple domain APIs, providing a layer of aggregation for a UI component to assemble relevant information from separate APIs corresponding to respective separate services. For example, in FIG. 5C depicting the collaterals context, the Rent Rolls composite API makes requests to both collateral financials and collateral facilities domain APIs to aggregate rent roll data from both services. Similarly, in the Deals context illustrated in FIG. 5D, the details composite API issues requests to both Deal Financials and Deals/Facility, Collateral Risk Rating Engine (RaRe) domain APIs to aggregate all deal details from multiple bounded contexts.

In some embodiments, the composite API layer may also provide a user API to issue calls to the hub via a user shim API at the domain layer. Thus, regardless of context, the user interface may include functionality for interacting with user settings and information, such as, e.g., account information, user input, etc. Each shared composite API may be built into a UI component of any UI context. Thus, the composite APIs provide flexibility with shared services to easily and efficiently modify and customize UI components for the user interface for shared services or external services (e.g., an extern financial spreading service and an external real estate financials service).

In some embodiments, as described above, the composite APIs coordinate domain APIs in a domain API layer. Each domain API may include an API configured to issue calls and receive returns from specific bounded contexts (e.g., bounded contexts 140, 240) and/or specific microservices within bounded contexts. In some embodiments, the composite APIs provide context-specific interfaces that interface with microservice specific domain APIs. As a result, microservice APIs can be organized into context using the composite APIs to facilitate constructing context specific UI component arrangements. Thus, for each aspect of customer relationship or customer management in commercial credit services, the composite APIs can provide context-specific user interfaces having UI components organized specifically for that aspect. For example, e.g., customer information and evaluation aspects can be displayed via a customer-specific UI having UI components served by customer context composite APIs that coordinate the domain APIs associated with each microservice applicable to the customer information and evaluation components.

Figure 6:
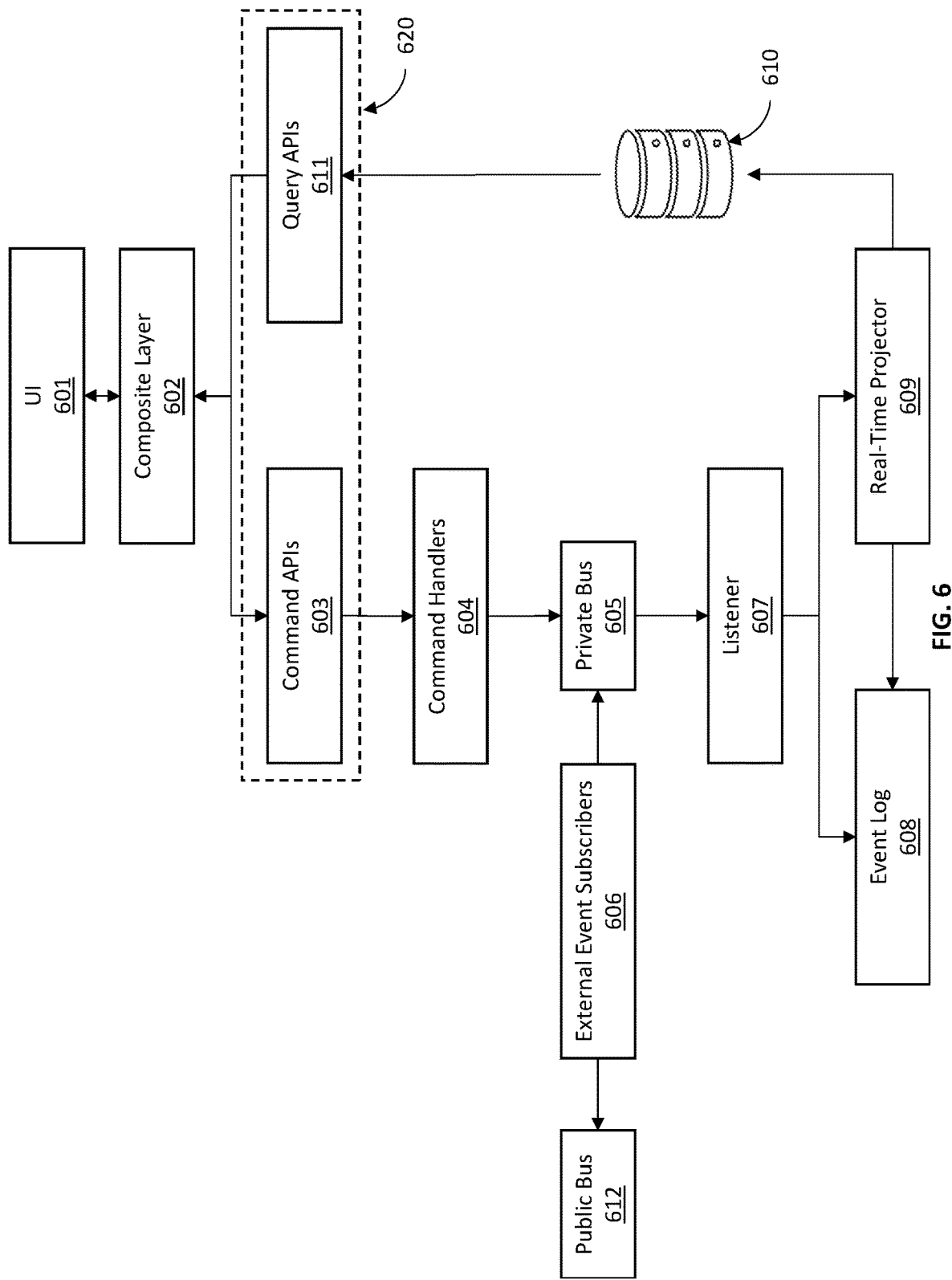

FIG. 6 illustrates a flowchart of another exemplary computer-based system for requesting and displaying underwriting and portfolio management data to UI components for bounded contexts in accordance with one or more embodiments of the present disclosure.

In some embodiments, for each context or microsite of a UI 601, such as the component based UI 460 described above, a composite layer 602 and a domain layer 620 may be used to coordinate services for a given context of the underwriting and portfolio management ecosystem. In some embodiments, each command can be logged in an event log 608 for effective event sourcing of microservices in the underwriting and portfolio management ecosystem. Thus, in some embodiments, a given UI component of the UI 601 may request data for display, such as, e.g., customer information, deal details, collateral details, etc. Accordingly, in some embodiments, the UI 601 may issue a call to a composite API in the composite layer 602 that coordinates service requests for the UI context having the given UI component.

The composite UI of the composite layer 602 may issue API calls to each command API 603 associated with the UI context of the given UI component. In some embodiments, the command APIs 603 in the domain layer 620 may include one or more APIs that interface with each microservice of a bounded context. For example, where the UI 601 is displaying information in the "Deals" context, the composite layer 602 may call all command APIs 603 for the "Deals" context, such as, e.g., Deal Details, Deal Financials, Covenants, Commentary, User among others. Thus, the command APIs 603 may include commands to a microservice of that context, such as, e.g., a ., Deal Details microservice, a Deal Financials microservice, a Covenants microservice, a Commentary microservice, a User microservice, respectively, among others.

In some embodiments, the commands from the command APIs 603 may be handled by respective command handlers 604. In some embodiments, the command handlers 604 include a command handler for each associated command API of the command APIs 603. In some embodiments, the command handlers 604 may receive a command and broker a result from an aggregate of commands and results, thereby forming messages to the appropriate services.

In particular, in some embodiments, the command handlers 604 may process each command and determine a validity of each command. In some embodiments, the command handlers 604, upon determining the validity of each command, may provide each command to a private bus 605 for communication to a directed endpoint. In some embodiments, a command may call an internal service, such as, e.g., a customer details microservice. The command handler 604 may broker the call via the private bus 605 to the customer details microservice of the customer bounded context. However, some commands may be calls to external services, in which the private bus 605 may communicate the command to an external event subscriber 606.

In some embodiments, the external event subscribers 606 implement a publish-subscribe messaging pattern, such as, e.g., a messaging pattern where senders of messages publish message without programming for specific receivers, but instead categorize published messages into classes. Similarly, subscribers may retrieve messages by subscribing to one or more classes and only receive messages of the selected classes, without knowledge of which publishers, if any, there are. Thus, in some embodiments, a command may subscribe to a class, such as, e.g., a particular Financial Spreading rating or subset of Financial Spreading ratings, and the extern event subscribers 606 implements the subscription and receives that attendant published response, communicating the response to the private bus 605. However, other messaging patterns and protocols may be employed. Accordingly, the private bus 604 may interface with a public bus 612 that communicates data, such as, e.g., Financial Spreading ratings, from a publicly accessed microservice.

In some embodiments, a listener 607 may listen for microservice returns in response to the commands. Similar to the command handlers 604, the listener 607 may handle messaging events including received messages. Upon receipt of a message from the private bus 605, the listener 607 may act as an event handler for received messages, taking predefine actions for each type of message received. In particular, regardless of the source of a message, the listener 607 may be configured to both write the message, e.g., to the event log 608, and to invoke a real-time projector 609 that builds real-time projections in response to the messages.

In some embodiments, the event log 608 include an append-only transaction record of all changes to state in a particular domain. Accordingly, in some embodiments, the event log 608 may store data regarding each message received by the listener 607 such that each event can be replayed as needed with a complete record of state changes to the domain. For example, on restart of a system, such as a user device 46 described above, the event log 608 may replay the last events to repopulate each UI component 462 of the UI 460. For example, if the command is to cancel a Facility, the listener 607 would write to the event log 608 that Facility 12345 was cancelled by this user on this date for this reason, and then update the projection via the real-time projector 609 so that the view of active facilities no longer includes Facility 12345.

In some embodiments, the real-time projector 609 may use the messages, either read from the event log 608 (e.g., on a restart), or as invoked by the listener 607 upon receipt of messages in response to commands, and build a projection of the message. In some embodiments, the real-time projector 609 may rebuild projections (read only views) affected by a change in state caused by the commands received by the listener 607 and/or recorded in the event log 608. For example, a visualization of credit risk may be built from messages responding to command API 603 commands related to a credit risk bounded context, as coordinated by the composite layer 602.

In some embodiments, the projections built by the real-time projector 609 may, in real-time with the receipt of the message, create, update and/or read data in a read-only database 610. For example, the read-only database 610 may include customer-related data such as, e.g., actuals, proposals, audits, collateral, and other data. The projections may affect one or more data records of the customer-related data. Thus, the projections may be provided to the read-only database 610 and modify the associated data records as dictated by the projection results.

In some embodiments, the read-only database 610 may be read by query APIs 611 in the domain layer 620. In some embodiments, the UI 601 may display UI components having data fields populated by data in a remote database, such as, e.g., the read-only database 620. For example, customer information may be stored remotely, e.g., in the read-only database 620. Thus, in a customer context, the UI 601 may query the read-only database for customer data associated with the customer context (e.g., customer account details, customer financials, etc.). Thus, the composite layer 602 may issue calls to query APIs based on API calls made by the UI 601 to search the read-only database 610 for the queried information and return the queried information via the query APIs 611 to the UI 601, thus updating the UI 601 display.

As a result, commands and queries may be handled by a domain layer 620 and coordinated by a composite layer 602 to update a UI 601, e.g., in real-time, using real-time event handling. As such, the UI 601 can be configured according to each context of the underwriting and portfolio management process with real-time event handling and event sourcing.

Figure 7A:
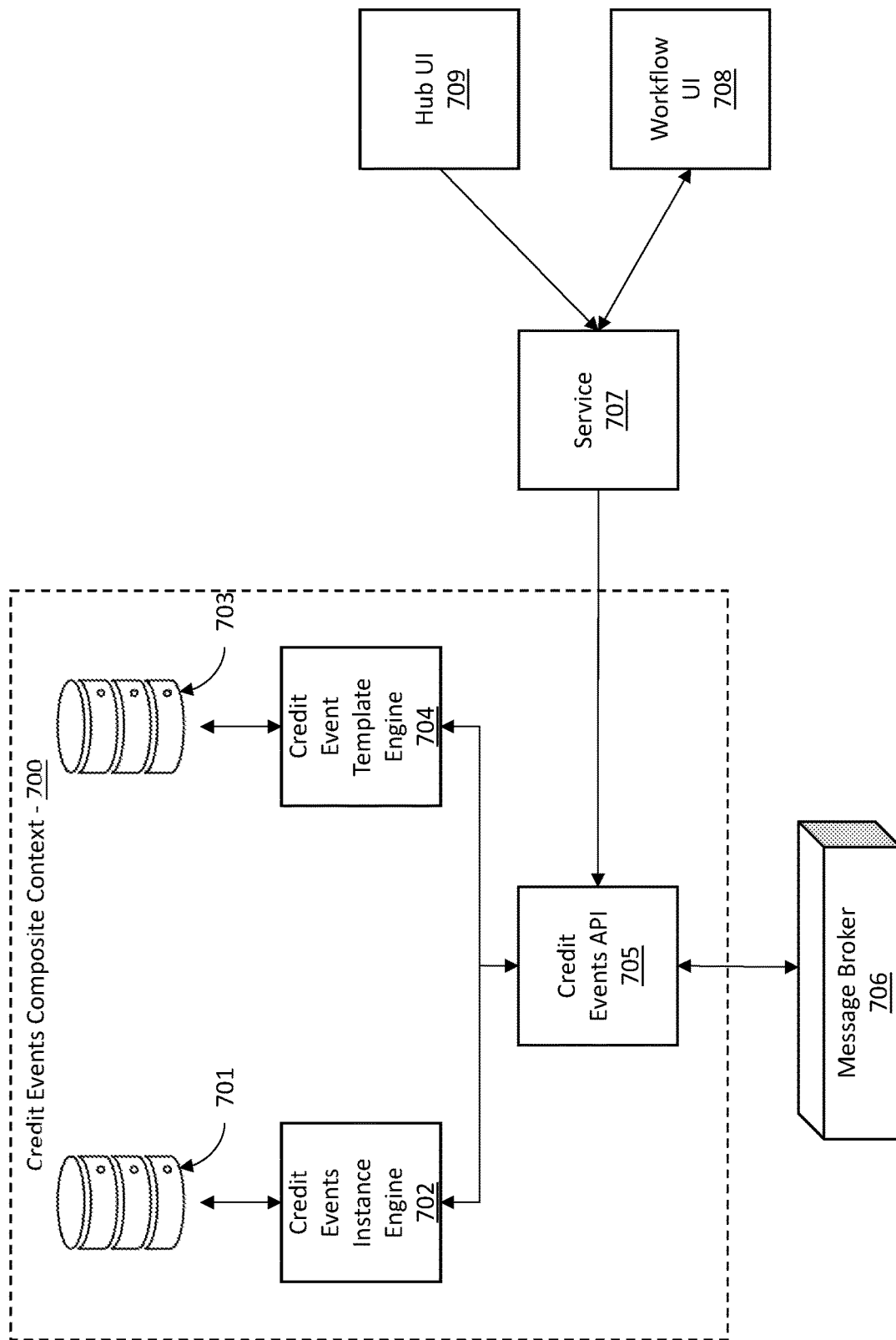
Figure 7B:
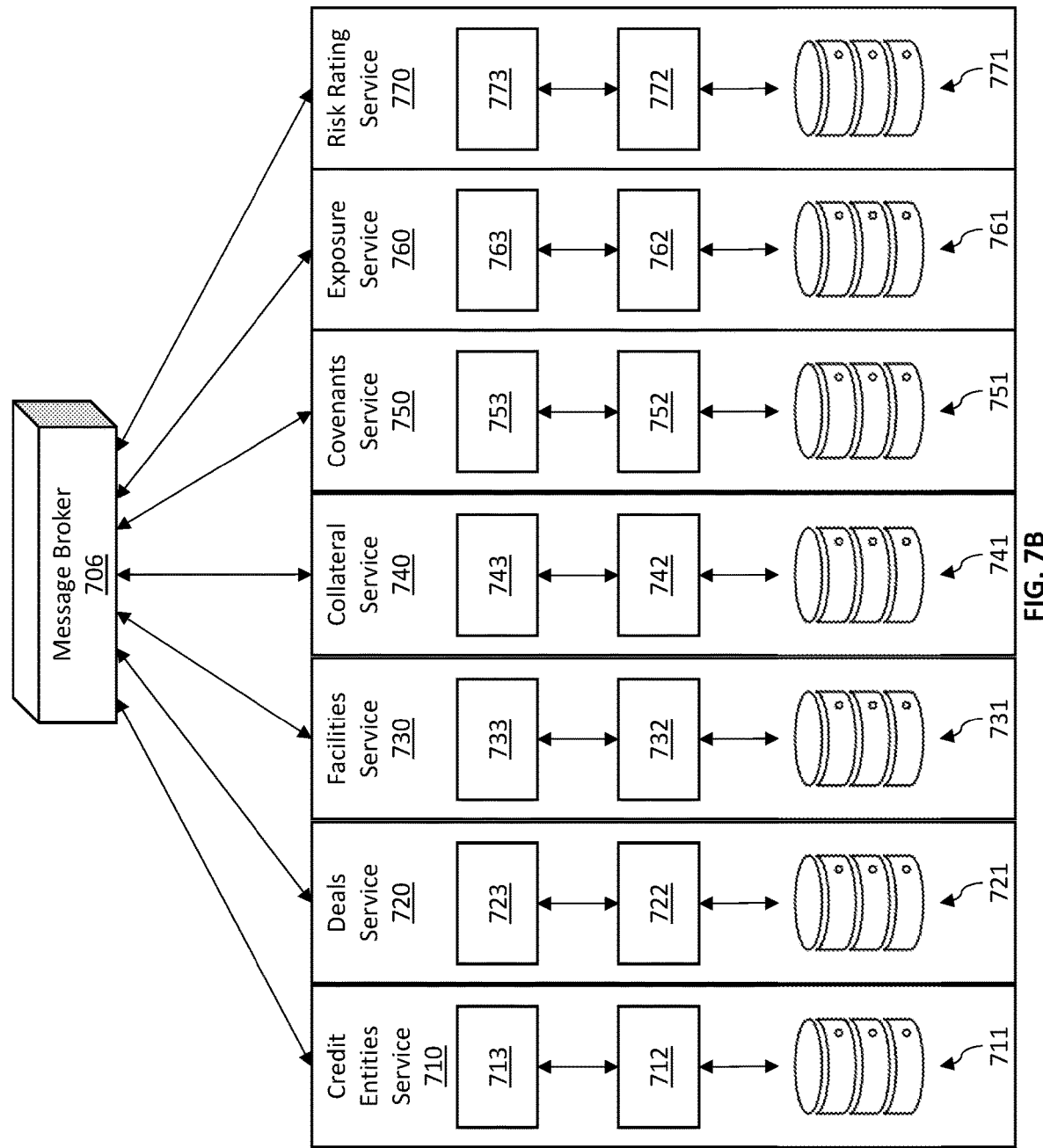

FIGS. 7A and 7B illustrate a block diagram of ecosystem architecture of an exemplary bounded context in accordance with one or more embodiments of the present disclosure.

In some embodiments, a given bounded context may be invoked in the underwriting and portfolio management ecosystem 106 of the present invention using a combination of composite APIs, message brokering and specific domains for bounded contexts of microservices. In some embodiments, FIG. 7A depicts a composite layer of the ecosystem 106 where a credit events composite context 700, as an example of a context, is invoked to build a hub UI 709 serving as a hub for visualizing credit events information, and a workflow UI 708 for interacting with credit events. In some embodiments, the hub UI 709 and workflow UI 708 interact with a service 707 to construct UI components associated with credit events. As such, the service 707 may make calls to a credit events API 705 for the credit event UI components and associated data.

In some embodiments, the credit events composite context 700 may build UI components for the hub UI 709 and workflow UI 708 from local credit event context data including credit event templates and credit event instances retrieved from a credit events templates database 703 and a credit events instances database 701, respectively. In some embodiments, the credit events templates in the credit events templates database 703 can include define the data structure and rules for each type of credit event. Additionally, in some embodiments, the credit event instances in the credit events instances database 701 may include unique instances that are instantiated using a template and validated against that template. Thus, the credit events composite context 700 may load UI templates and functions for the UI components using the local data in the credit events templates database 703 and the credit events instances database 701. However, in some embodiments, some of the credit event data is not local to the service 707 or credit events composite context 700, and thus must be retrieved from other microservices. As a result, the credit events API 705 may function as a composite API to call one or more domain APIs associated with additional domains for retrieving credit event related data.

Thus, in some embodiments, the credit events API 705 may also issue API calls to additional ecosystem microservices. For example, in some embodiments, the credit events API 705 may also issue API calls regarding various aspects of a customer's credit history, including, e.g., various financial, deal, facility, covenant, exposure and risk events. In some embodiments, to handle the credit event API 705 calls, a message broker 706 may be employed. In some embodiments, the message broker 706 may handle the API calls to redirect the API calls, e.g., using the event sourcing architecture described above with reference to FIG. 6, to communicate the API calls to either private or public busses.

In some embodiments, the message broker 706 may interact with additional contexts as illustrated in FIG. 7B. In some embodiments, the message broker 706 may be configured to broker messages between the credit events API 705 and microservices including a credit entities service 710, a deals service 720, a facilities service 730, a collateral service 740, a covenants service 750, an exposure service 760 and a risk rating service 770, among others.

In some embodiments, the credit entities service 719 includes a credit entities database 711. In some embodiments, the credit entities database 711 include data related to credit entities, such as names, addresses, customer financials, capital structure, entity valuation, legal entities, among other information. In some embodiments, a credit entity can be any actual or conceptual entity, including an association or group of legal entities that are in a credit relationship. Thus, in some embodiments, the credit entities service 719 may access one or more legal entities in the credit entities database 711 based on the joining of legal entities that share an obligation for the purposes of obtaining credit so that the legal entities may be treated as a consolidated credit entity. In some embodiments, a credit entities domain API 712 is configured to issue calls to the credit entities database 711 to retrieve credit entity data based on the credit events API 705 calls routed via the message broker 706 to the credit entities service 710. The returns of the credit entities domain API 712 calls can be provided to a credit entities provider 713 configured to operate as a private bus to communicate with the message broker 706, e.g., in a publish-subscribe messaging pattern.

In some embodiments, the deals service 729 includes a deals database 721. In some embodiments, the deals database 721 include data related to deals, such as deal histories and deal financials, among other information. In some embodiments, a deals domain API 722 is configured to issue calls to the deals database 721 to retrieve credit entity data based on the credit events API 705 calls routed via the message broker 706 to the deals service 720. The returns of the deals domain API 722 calls can be provided to a deals provider 723 configured to operate as a private bus to communicate with the message broker 706, e.g., in a publish-subscribe messaging pattern.

In some embodiments, the facilities service 739 includes a facilities database 731. In some embodiments, the facilities database 731 include data related to facilities, such as cancellations and facility identifiers and related data, among other information. In some embodiments, a facilities domain API 732 is configured to issue calls to the facilities database 731 to retrieve credit entity data based on the credit events API 705 calls routed via the message broker 706 to the facilities service 730. The returns of the facilities domain API 732 calls can be provided to a facilities provider 733 configured to operate as a private bus to communicate with the message broker 706, e.g., in a publish-subscribe messaging pattern.

In some embodiments, the collateral service 749 includes a collateral database 741. In some embodiments, the collateral database 741 include data related to collateral, such as collateral details, collateral financials, rent rolls, among other information. In some embodiments, a collateral domain API 742 is configured to issue calls to the collateral database 741 to retrieve credit entity data based on the credit events API 705 calls routed via the message broker 706 to the collateral service 740. The returns of the collateral domain API 742 calls can be provided to a collateral provider 743 configured to operate as a private bus to communicate with the message broker 706, e.g., in a publish-subscribe messaging pattern.

In some embodiments, the covenants service 759 includes a covenants database 751. In some embodiments, the covenants database 751 include data related to covenants, such as covenant details, covenant financials, among other information. In some embodiments, a covenants domain API 752 is configured to issue calls to the covenants database 751 to retrieve credit entity data based on the credit events API 705 calls routed via the message broker 706 to the covenants service 750. The returns of the covenants domain API 752 calls can be provided to a covenants provider 753 configured to operate as a private bus to communicate with the message broker 706, e.g., in a publish-subscribe messaging pattern.

In some embodiments, the exposure service 769 includes an exposure database 761. In some embodiments, the exposure database 761 include data related to exposure, such as risks, investments, credits, among other information. In some embodiments, exposure refers to amounts of outstanding facilities. Thus, an exposure service 769 may make use of the exposure database 761 data to provide aggregations and slices of that exposure across the ecosystem 103. For example, all of the facility values across all customers may be aggregated for a given line or business, or geography, etc. for determining the exposure of the given line, business, or geography, etc. In some embodiments, an exposure domain API 762 is configured to issue calls to the exposure database 761 to retrieve credit entity data based on the credit events API 705 calls routed via the message broker 706 to the exposure service 760. The returns of the exposure domain API 762 calls can be provided to an exposure provider 763 configured to operate as a private bus to communicate with the message broker 706, e.g., in a publish-subscribe messaging pattern.

In some embodiments, the risk rating service 779 includes a risk rating database 771. In some embodiments, the risk rating service 779 may be configured to determine a risk rating according to, e.g., a probability of default, and a loss given default. In some embodiments, the calculation of these metrics may include, e.g., customer financials, industry, facility and collateral details, etc. Thus, in some embodiments, the risk rating database 771 include data related to risk rating, such as customer financials, industry, facility and collateral details, credit balance, account balance, investments, among other information. In some embodiments, a risk rating domain API 772 is configured to issue calls to the risk rating database 771 to retrieve credit entity data based on the credit events API 705 calls routed via the message broker 706 to the risk rating service 770. The returns of the risk rating domain API 772 calls can be provided to a risk rating provider 773 configured to operate as a private bus to communicate with the message broker 706, e.g., in a publish-subscribe messaging pattern.

In some embodiments, the message broker 706 may coordinate the domain specific services 710, 720, 730, 740, 750, 760 and 770 described above according to a brokering of messages based on the credit events API 705 API calls. As a result, the service 707 may return credit events UI components to the hub UI 709 and workflow UI 708, including composited services according to the credit events composite context 700.

Figure 8A:
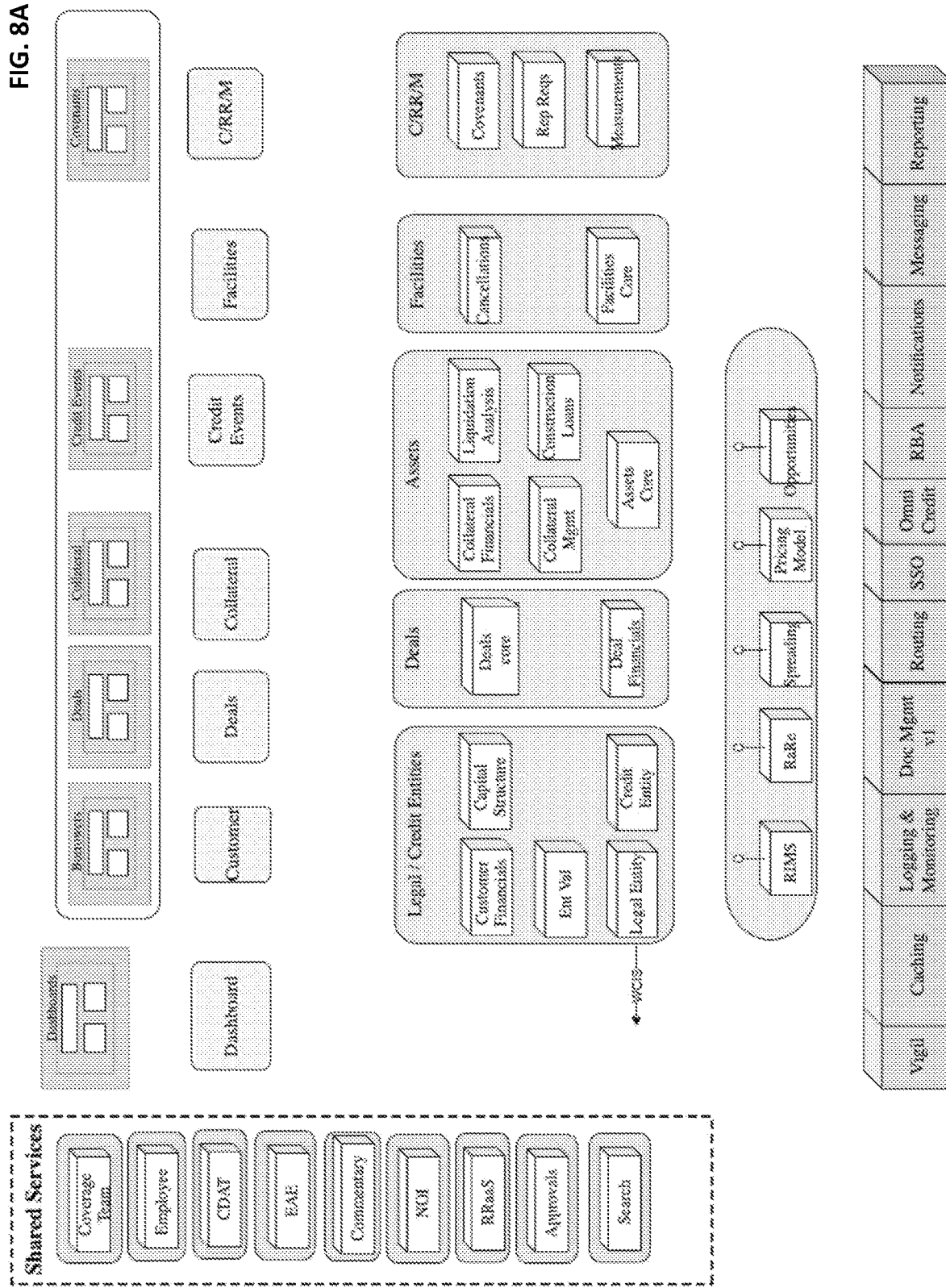
Figure 8B:
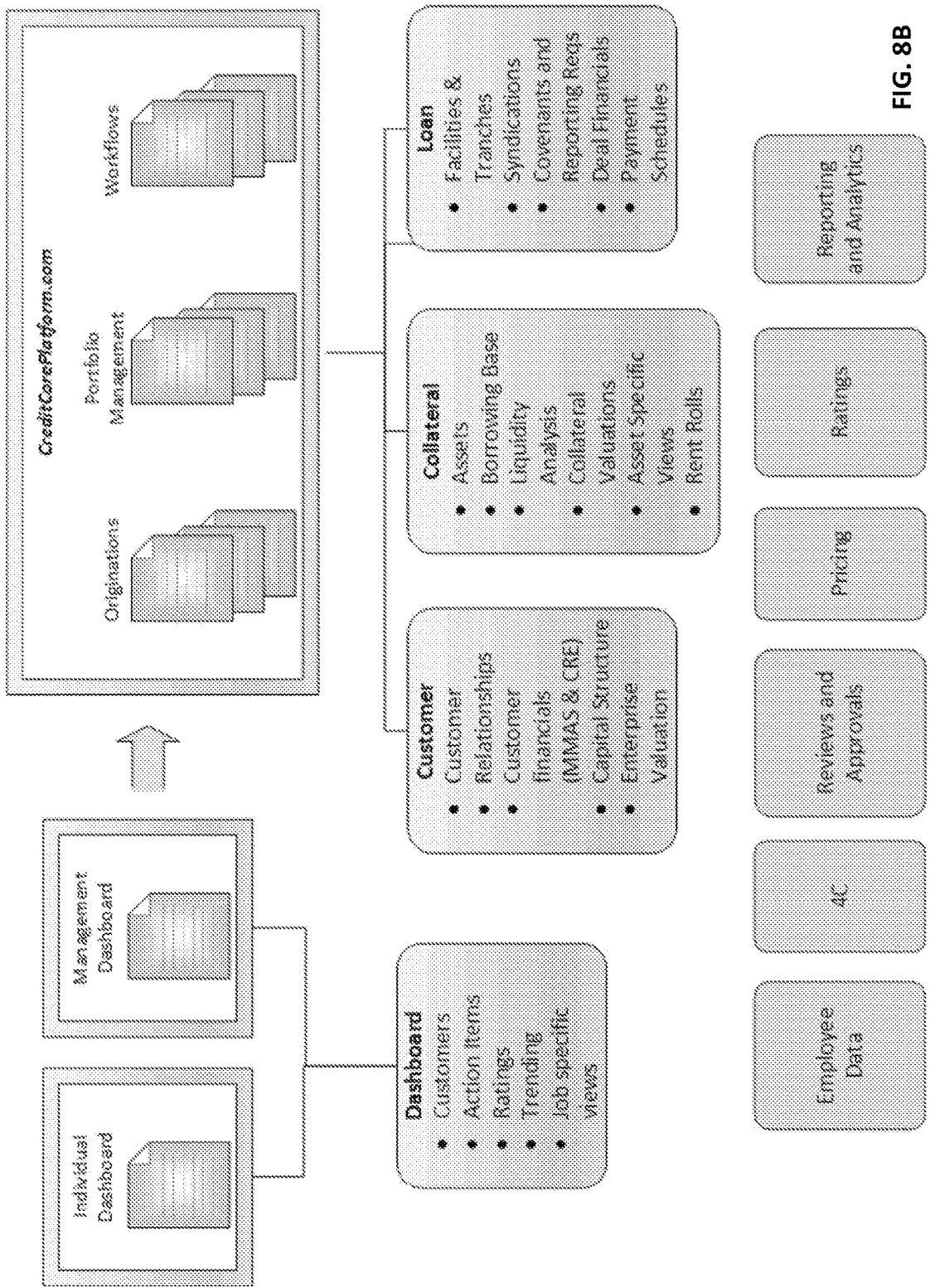

FIGS. 8A and 8B illustrates an exemplary underwriting and portfolio management ecosystem leveraging bounded contexts formed from composites of domain specific services for delivering user interface components in accordance with one or more embodiments of the present invention.

In some embodiments, the ecosystem 106 may include a dashboard (e.g., hub UI 709) and context-specific UIs (e.g., workflow UI 708) that deliver respective aspects of a customer credit portfolio for underwriting and portfolio management. In some embodiments, the context-specific UIs can include, e.g., a borrowers UI, deals UI, collateral UI, credit events UI, covenants UI, among others. Each context-specific UI may be associated with a composite API at a composite API layer. In some embodiments, the composite APIs define the bounded contexts 140 described above. Thus, the borrowers UI may be built out using a customer composite API, the deals UI may be built out with a deals composite UI, the collateral UI may be built out with a collateral composite UI, the credit events UI may be built out with a credit events composite UI, the covenants UI may be built out with a covenants composite UI, and any other composite UI for building out other aspects of the context-specific UIs. Similarly, the dashboard may have a dashboard composite API for building out a dashboard with short summaries of each of the context-specific UIs.

In some embodiments, each composite API may issue calls to one or more domain-specific services. For examples, the credit entities composite API may issue calls to services in the credit entities bounded context including services for customer financials, capital structure, entity valuation, legal entity, credit entity, among others. Accordingly, each composite API may interface with multiple domain APIs associated with the services appropriate for the respective bounded context.

In some embodiments, the composite APIs may also interface with shared services, such as, e.g., a coverage team service, an employee service, a Credit Decision Authorities Tool (CDAT) service, an Exposure Aggregation Engine (EAE) service, a commentary service, a net operating income (NOI) service, a risk rating as a service (RRaaS) service, an approvals service, a search service, among others. Accordingly, context-specific services of a bounded context can be augmented with information from shared services to provide greater detail and insight to the context-specific UIs.

In some embodiments, the services and APIs may be instantiated using platform components. For example, API calls, returns and other messages may be routing using a routing component, notifications may be generated, messaging may be handled (e.g., using the event sourcing architecture described above), reporting may be performed for, e.g., event reports, errors, among other reporting, as well as other platform level functionality.

In some embodiments, FIG. 8B depicts an architecture of a target state application of a credit core platform using the architecture of FIG. 8A. In some embodiments, the application can include, e.g., the dashboard, customer, collateral and loan UIs as described above. In some embodiments, an individual and a manager may see different individual and management dashboards, respectively. Each of the dashboards may depict a customized view of the customers, action items across portfolios of the customers, ratings, trending items, and job specific views, among other components.

In some embodiments, from the dashboard, a user may enter into a particular UI context, such as a customer context, collateral context, loan context, or other context as described above. In some embodiments, the customer context may include components for, e.g., customer details, customer relationships, customer financials (e.g., according to a material management and account system (MMAS) and commercial real estate (CRE)), capital structure of the customer, and enterprise valuation of the customer, among others. In some embodiments, the collateral context can include components for, e.g., assets, borrowing base, liquidity analysis, collateral valuations, asset specific views, and rent rolls, among others. In some embodiments, the loan context can include facilities and tranches details, syndications, covenants and reporting requirements, deal financials, payment schedules, among others. In some embodiments, the customer, collateral and loan contexts may be accessible via, e.g., an originations environment of the platform, a portfolio management environment, a workflow environment, or other environment within the target state application of the ecosystem. Thus, different stages of a customer relationship may be embodied in the ecosystem, where each stage may be formed by an environment populated with the associated bounded contexts or domains relevant to that stage.

In some embodiments, each context and the UI components therein may be populated according to data provided by associated services. For example, services may include, e.g., employee data, deal coverage team (4C), reviews and approvals, pricing, ratings, reporting and analytics, among other services. In some embodiments, these services are shared across the platform to track, e.g., an entity's progression through the stages of the customer relationship (e.g., origination, portfolio management, workflows, etc.).

Figure 9:
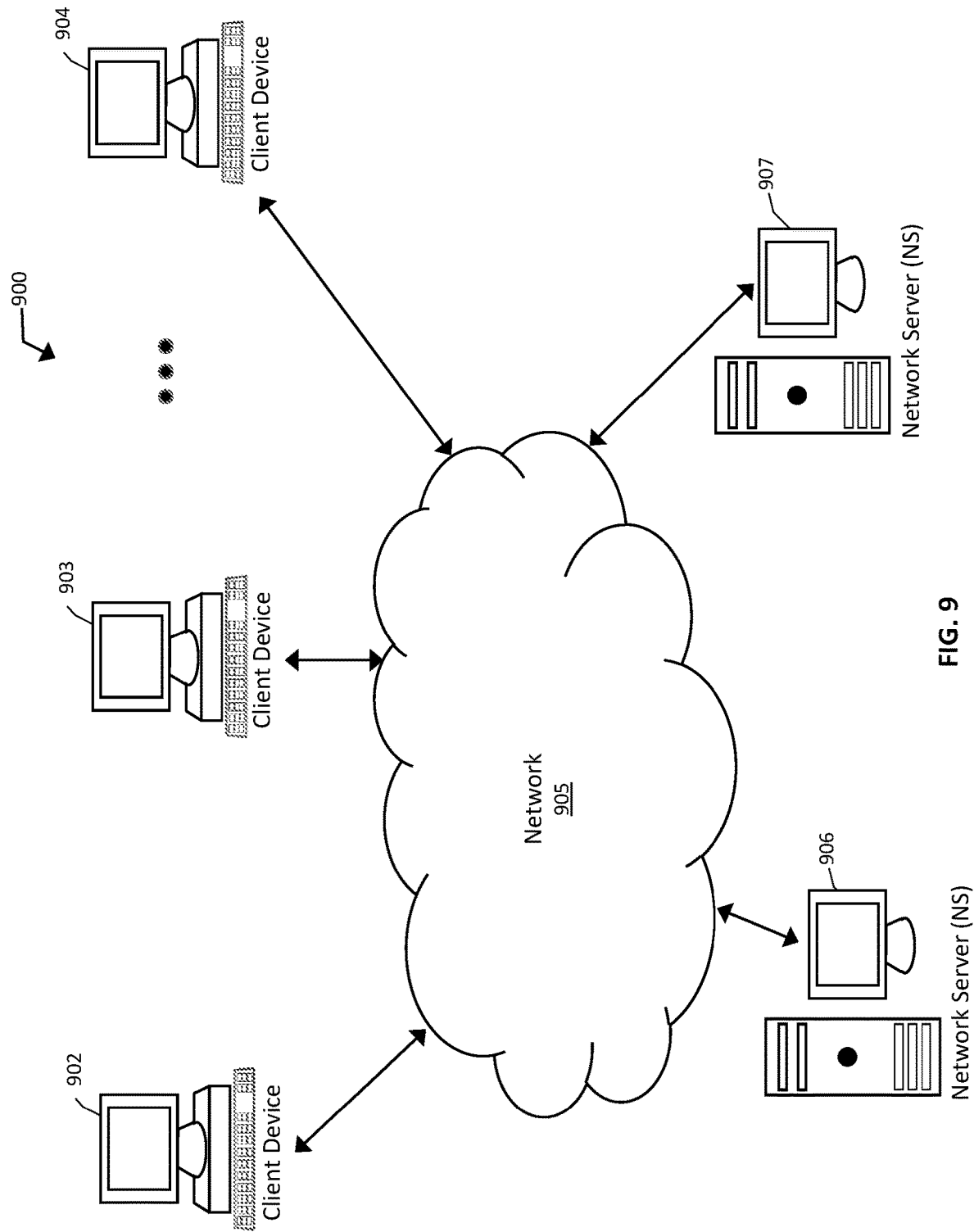

FIG. 9 depicts a block diagram of an exemplary computer-based system 90 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system 900 may be configured to manage a large number of members and/or concurrent transactions, as detailed herein. In some embodiments, the exemplary computer-based system 90 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 9, members 902-904 (e.g., clients) of the exemplary computer-based system 900 may include virtually any computing device capable of receiving and sending a message over a network (e.g., cloud network), such as network 905, to and from another computing device, such as servers 906 and 907, each other, and the like. In some embodiments, the member devices 902-904 may be personal computers, multiprocessor systems, microprocessor-based or programmable consumer electronics, network PCs, and the like. In some embodiments, one or more member devices within member devices 902-904 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 902-904 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 9G, GSM, GPRS, WiFi, WiMax, CDMA, satellite, ZigBee, etc.). In some embodiments, one or more member devices within member devices 902-904 may include may run one or more applications, such as Internet browsers, mobile applications, voice calls, video games, videoconferencing, and email, among others. In some embodiments, one or more member devices within member devices 902-904 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 902-904 may be specifically programmed by either Java, .Net, QT, C, C++ and/or other suitable programming language. In some embodiments, one or more member devices within member devices 902-904 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 905 may provide network access, data transport and/or other services to any computing device coupled to it. In some embodiments, the exemplary network 905 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 905 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 905 may include and implement, as an alternative or in conjunction with one or more of the above, a WiMAX architecture defined by the WiMAX forum. In some embodiments and, optionally, in combination of any embodiment described above or below, the exemplary network 905 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 905 may be transmitted based at least in part on one of more communication modes such as but not limited to: NFC, RFID, Narrow Band Internet of Things (NBIOT), ZigBee, 3G, 4G, 9G, GSM, GPRS, WiFi, WiMax, CDMA, satellite and any combination thereof. In some embodiments, the exemplary network 905 may also include mass storage, such as network attached storage (NAS), a storage area network (SAN), a content delivery network (CDN) or other forms of computer or machine readable media.

In some embodiments, the exemplary server 906 or the exemplary server 907 may be a web server (or a series of servers) running a network operating system, examples of which may include but are not limited to Microsoft Windows Server, Novell NetWare, or Linux. In some embodiments, the exemplary server 906 or the exemplary server 907 may be used for and/or provide cloud and/or network computing. Although not shown in FIG. 9, in some embodiments, the exemplary server 906 or the exemplary server 907 may have connections to external systems like email, SMS messaging, text messaging, ad content providers, etc. Any of the features of the exemplary server 906 may be also implemented in the exemplary server 907 and vice versa.

In some embodiments, one or more of the exemplary servers 906 and 907 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 901-904.

In some embodiments and, optionally, in combination of any embodiment described above or below, for example, one or more exemplary computing member devices 902-904, the exemplary server 906, and/or the exemplary server 907 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 10:
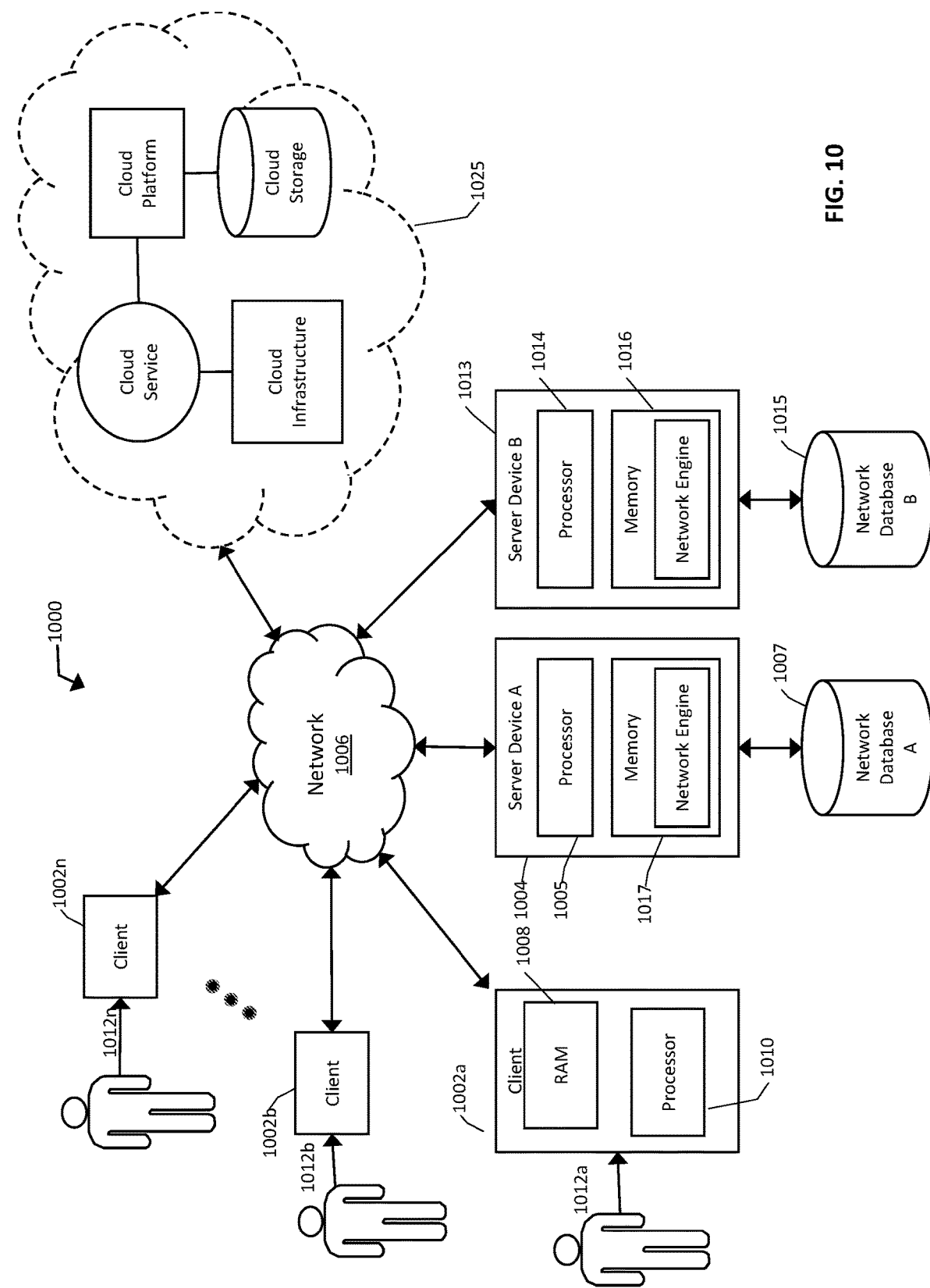

FIG. 10 depicts a block diagram of another exemplary computer-based system 1000 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 1002a, 1002b thru 1002n shown each at least includes a computer-readable medium, such as a random-access memory (RAM) 1008 coupled to a processor 1010 or FLASH memory. In some embodiments, the processor 1010 may execute computer-executable program instructions stored in memory 1008. In some embodiments, the processor 1010 may include a microprocessor, an ASIC, and/or a state machine. In some embodiments, the processor 1010 may include, or may be in communication with, media, for example computer-readable media, which stores instructions that, when executed by the processor 1010, may cause the processor 1010 to perform one or more steps described herein. In some embodiments, examples of computer-readable media may include, but are not limited to, an electronic, optical, magnetic, or other storage or transmission device capable of providing a processor, such as the processor 1010 of client 1002a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 1002a-1002n may also comprise a number of external or internal devices such as a mouse, a CD-ROM, DVD, a physical or virtual keyboard, a display, a speaker, or other input or output devices. In some embodiments, examples of member computing devices 1002a-1002n (e.g., clients) may be any type of processor-based platforms that are connected to a network 1006 such as, without limitation, personal computers, digital assistants, personal digital assistants, smart phones, pagers, digital tablets, laptop computers, Internet appliances, and other processor-based devices. In some embodiments, member computing devices 1002a-1002n may be specifically programmed with one or more application programs in accordance with one or more principles/methodologies detailed herein. In some embodiments, member computing devices 1002a-1002n may operate on any operating system capable of supporting a browser or browser-enabled application, such as Microsoft™, Windows™, and/or Linux. In some embodiments, member computing devices 1002a-1002n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 1002a-1002n, users 1012a-1012n, may communicate over the exemplary network 1006 with each other and/or with other systems and/or devices coupled to the network 1006. As shown in FIG. 10, exemplary server devices 1004 and 1013 may be also coupled to the network 1006. In some embodiments, one or more member computing devices 1002a-1002n may be mobile clients.

In some embodiments, at least one database of exemplary databases 1007 and 1015 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 11:
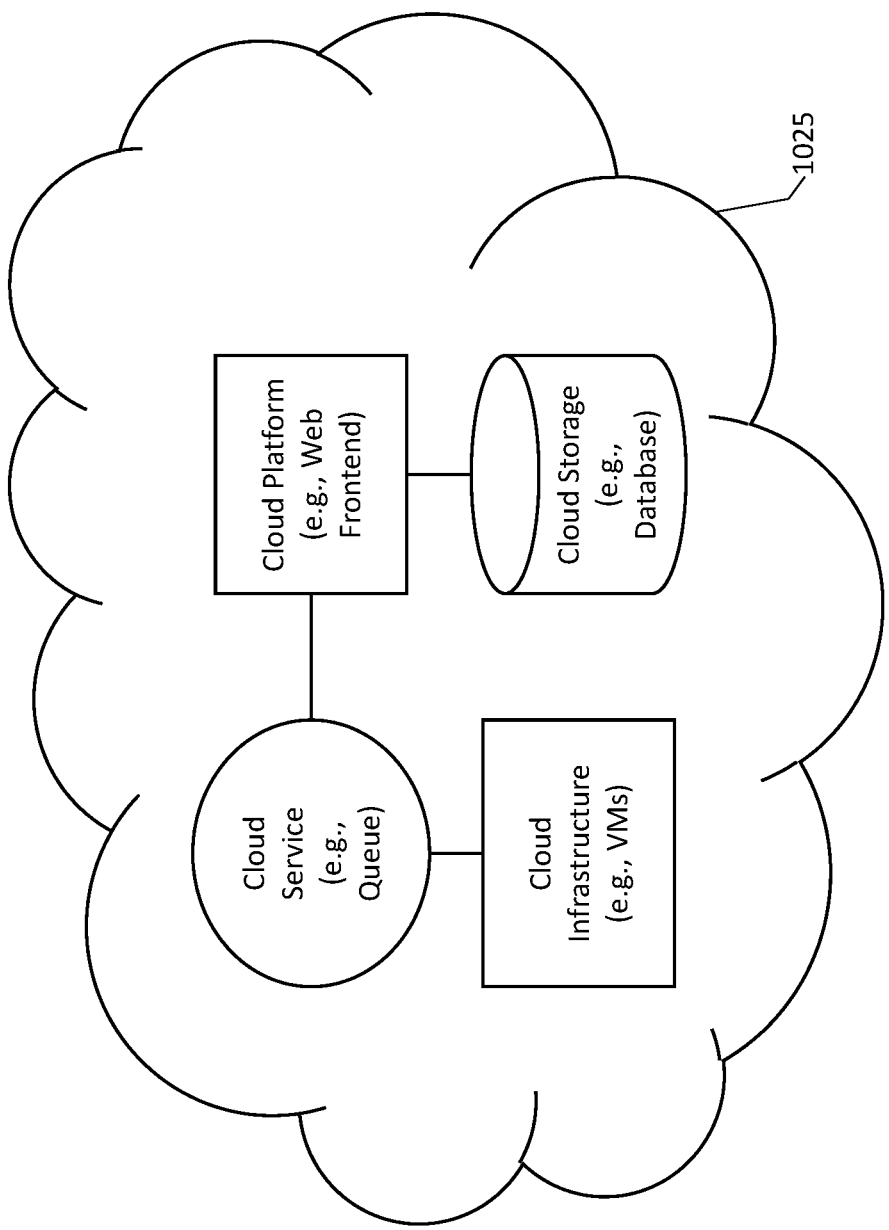
Figure 12:
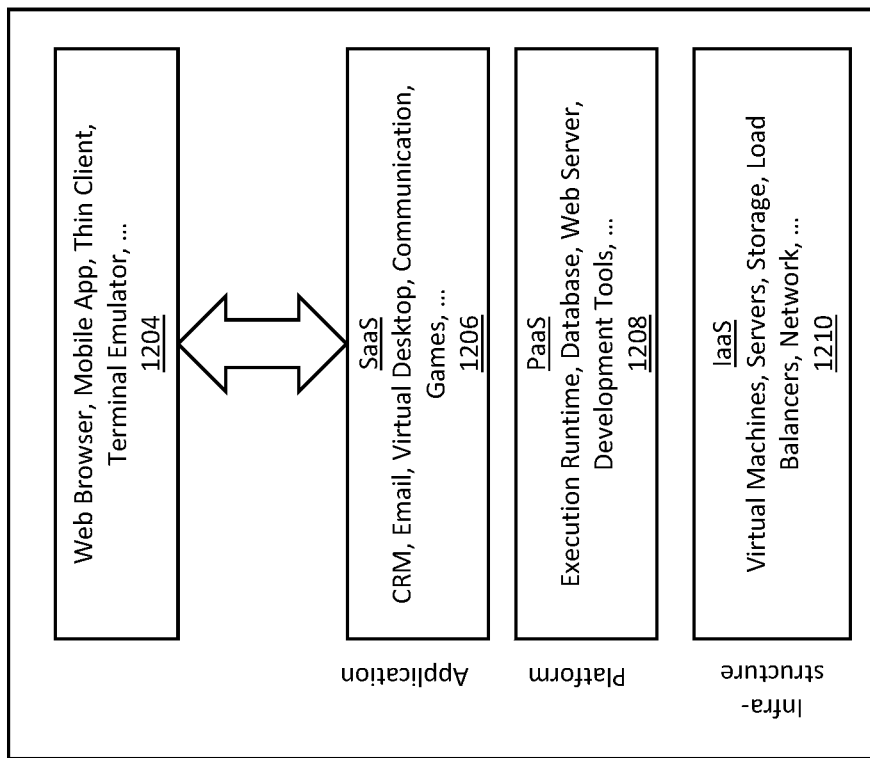

In some embodiments, the exemplary inventive computer-based systems of the present disclosure may be specifically configured to operate in a cloud computing/architecture such as, but not limiting to: infrastructure a service (IaaS), platform as a service (PaaS), and/or software as a service (SaaS). FIGS. 11 and 12 illustrate schematics of exemplary implementations of the cloud computing/architecture(s) in which the exemplary inventive computer-based systems of the present disclosure may be specifically configured to operate.

At least some aspects of the present disclosure will now be described with reference to the following numbered clauses:

1. A method comprising:
    receiving, by at least one processor, at least one composite application programming interface (API) command associated with a user interface (UI) selection for a context of a portfolio management UI in a portfolio management application;

wherein the context of the portfolio management UI comprises a collection of context-specific UI components for presenting context-specific data associated with an associated collection of portfolio management tasks of at least one portfolio management stage of a plurality of portfolio management stages in the portfolio management application;

wherein the collection of portfolio management tasks comprises a selection from a plurality of portfolio management tasks of the plurality of portfolio management stages based on the at least one composite API command;

generating, by the at least one processor, UI component structures based on the at least one composite API command for presenting the context-specific resources;

generating, by the at least one processor, a set of domain API commands associated with each composite API command of the at least one composite API command;

wherein the set of domain API commands comprise a plurality of microservice-specific API commands for invoking the collection of portfolio management tasks using a respective collection of portfolio management microservices of a plurality of portfolio management microservices;

wherein the plurality of portfolio management microservices are configured to generate the context-specific resources according to the plurality of portfolio management tasks;

receiving, by the at least one processor, in response to each respective domain API command of the set of domain API commands, the context-specific data from the respective collection of portfolio management microservices to populate the collection of context-specific UI components according to the at least one portfolio management stage of the context of the portfolio management UI;

generating, by the at least one processor, a context-specific portfolio visualization associated with the context of portfolio management based on the context-specific resources of the collection of context-specific UI components; and causing to display, by the at least one processor, the portfolio visualization with the selected user interface component of the portfolio management user interface by at least one computing device associated with at least one user.

2. A method comprising:
receiving, by at least one processor, a user interface (UI) selection comprising a selected user interface component of a portfolio management user interface;
wherein the context of the portfolio management UI comprises a collection of context-specific UI components for presenting context-specific data associated with an associated collection of portfolio management tasks of at least one portfolio management stage of a plurality of portfolio management stages in the portfolio management application;
generating, by at least one processor, at least one composite application programming interface (API) command associated with the UI selection for a context of a portfolio management UI;
wherein the collection of portfolio management tasks comprises a selection from a plurality of portfolio management tasks of the plurality of portfolio management stages based on the at least one composite API command;

generating, by the at least one processor, UI component structures based on the at least one composite API command;

communicating, by the at least one processor, the at least one composite API command to a portfolio management processing system;
wherein the portfolio management processing system generates a set of domain API commands associated with each composite API command of the at least one composite API command;
wherein the set of domain API commands comprise a plurality of microservice-specific API commands for invoking the collection of portfolio management tasks using a respective collection of portfolio management microservices of a plurality of portfolio management microservices;
wherein the plurality of portfolio management microservices are configured to generate the context-specific resources according to the plurality of portfolio management tasks;

receiving, by the at least one processor, in response to each respective domain API command of the set of domain API commands, the context-specific data from the respective collection of portfolio management microservices to populate the collection of context-specific UI components according to the at least one portfolio management stage of the context of the portfolio management UI;

generating, by the at least one processor, a context-specific portfolio visualization associated with the context of portfolio management based on the context-specific resources of the collection of context-specific UI components; and causing to display, by the at least one processor, the portfolio visualization with the selected user interface component of the portfolio management user interface by at least one computing device associated with at least one user.

3. A system comprising:
at least one processor, configured to execute software instructions causing the at least one processor to perform steps to:
receive at least one composite application programming interface (API) command associated with a user interface (UI) selection for a context of a portfolio management UI in a portfolio management application;
wherein the context of the portfolio management UI comprises a collection of context-specific UI components for presenting context-specific data associated with an associated collection of portfolio management tasks of at least one portfolio management stage of a plurality of portfolio management stages in the portfolio management application;
wherein the collection of portfolio management tasks comprises a selection from a plurality of portfolio management tasks of the plurality of portfolio management stages based on the at least one composite API command;
generate UI component structures based on the at least one composite API command for presenting the context-specific resources;

generate a set of domain API commands associated with each composite API command of the at least one composite API command;
  wherein the set of domain API commands comprise a plurality of microservice-specific API commands for invoking the collection of portfolio management tasks using a respective collection of portfolio management microservices of a plurality of portfolio management microservices;
    wherein the plurality of portfolio management microservices are configured to generate the context-specific resources according to the plurality of portfolio management tasks;
  receive in response to each respective domain API command of the set of domain API commands, the context-specific data from the respective collection of portfolio management microservices to populate the collection of context-specific UI components according to the at least one portfolio management stage of the context of the portfolio management UI;
  generate a context-specific portfolio visualization associated with the context of portfolio management based on the context-specific resources of the collection of context-specific UI components; and
  cause to display the portfolio visualization with the selected user interface component of the portfolio management user interface by at least one computing device associated with at least one user.

4. The systems and methods of clauses 1, 2 and/or 3, wherein the context of portfolio management is selectable from a dashboard UI of the portfolio management UI.

5. The systems and methods of clause 4, wherein context comprises a credit entities context associated with a credit entities microservice for aggregating one or more related legal entities having common lines of credit.

6. The systems and methods of clauses 1, 2 and/or 3, wherein the as least one portfolio management microservice further comprises at least one shared microservice for performing portfolio management tasks common to a plurality of contexts.

7. The systems and methods of clauses 1, 2 and/or 3, further comprising retrieving, by the at least one processor, one or more user interface templates and one or more user interface functions associated with the selected user interface component in response to the set of composite API commands.

8. The systems and methods of clauses 1, 2 and/or 3, further comprising generating, by the at least one processor, financial projections based on microservice responses to each respective domain API command.

9. The systems and methods of clause 8, further comprising recording, by the at least one processor, the context-specific data associated with each respective portfolio management microservice in an event log.

10. The systems and methods of clause 9, further comprising rebuilding, by the at least one processor, the financial projections based on the event log.

11. The systems and methods of clauses 1, 2 and/or 3, wherein the plurality of portfolio management microservice comprises as least one public microservice.

12. The systems and methods of clauses 1, 2 and/or 3, wherein the at least one public microservice comprises a third-party credit rating service, a commercial real estate financial evaluation service, or both.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
  generating, by at least one processor, a collection of context-specific user interface (UI) components associated with a particular context of a UI based at least in part on a context-based organization structure that defines at least one context within the UI;
  instructing, by the at least one processor, via at least one first electronic communication over a network, at least one computing device to display context-specific data using the collection of context-specific UI components in the context of the UI;
  receiving, by the at least one processor from the at least one computing device via at least one second electronic communication over the network, user input data via a composite software command associated with the collection of context-specific UI components;
    wherein the user input data comprises a plurality of user input data items;
    wherein the composite software command comprises a single command is mapped to a set of domain software commands;
    wherein the composite software command is configured to invoke each domain software command in the set of domain software commands based at least in part on the plurality of user input data items;
  determining, by the at least one processor, at least one user input data item of the user input data items associated with each respective domain software command of the set of domain software commands; and
  generating, by the at least one processor, the set of domain commands having the at least one user input data item of the user input data items associated with each respective domain software command of the set of domain software commands, each domain command of the set of domain commands being configured to cause at least one operation associated with at least one domain in a set of domains.

2. The method of claim 1, further comprising:
  generating, by the at least one processor, a collection of context-specific UI components associated with the context of the UI; and
  instructing, by the at least one processor, the at least one computing device to display the context-specific data using the collection of context-specific UI components in the context of the UI.

3. The method of claim 1, further comprising:
  receiving, by the at least one processor, user input data via the at least one composite software command;
    wherein the user input data comprises a plurality of user input data items;
  determining, by the at least one processor, at least one user input data item of the user input data items associated with each respective domain software command of the set of domain software commands; and
  generating, by the at least one processor, a set of domain commands having the at least one user input data item of the user input data items associated with each respective domain software command of the set of domain software commands.

4. The method of claim 1, wherein the context of portfolio management is selectable from a dashboard UI of the UI.

5. The method of claim 4, wherein context comprises a credit entities context associated with a credit entities microservice for aggregating one or more related legal entities having common lines of credit.

6. The method of claim 1, wherein the set of domain software commands is associated with a respective collection of microservices further comprises at least one shared microservice for performing at least one task common to a plurality of contexts.

7. The method of claim 1, further comprising retrieving, by the at least one processor, one or more user interface templates and one or more user interface functions associated with the context of the UI in response to the at least one composite software command.

8. The method of claim 1, further comprising generating, by the at least one processor, financial projections based on microservice responses to each respective domain software command.

9. The method of claim 1, further comprising recording, by the at least one processor, the context-specific data associated with each respective portfolio management microservice in an event log.

10. The method of claim 1, wherein the set of domain software commands is associated with at least one public microservice.

11. A system comprising:
   at least one processor in communication with at least one non-transitory computer readable medium having software instructions stored thereon, wherein the at least one processor, upon execution of the software instructions, is configured to:
   generate collection of context-specific user interface (UI) components associated with a particular context of a UI based at least in part on a context-based organization structure that defines at least one context within the UI;
   instruct, via at least one first electronic communication over a network, at least one computing device to display context-specific data using the collection of context-specific UI components in the context of the UI;
   receive, from the at least one computing device via at least one second electronic communication over the network, user input data via a composite software command associated with the collection of context-specific UI components;
   wherein the user input data comprises a plurality of user input data items;
   wherein the composite software command comprises a single command is mapped to a set of domain software commands;
   wherein the composite software command is configured to invoke each domain software command in the set of domain software commands based at least in part on the plurality of user input data items;
   determine at least one user input data item of the user input data items associated with each respective domain software command of the set of domain software commands; and
   generate the set of domain commands having the at least one user input data item of the user input data items associated with each respective domain software command of the set of domain software commands, each domain command of the set of domain commands being configured to cause at least one operation associated with at least one domain in a set of domains.

12. The system of claim 11, wherein the context is selectable from a dashboard UI of a software application.

13. The system of claim 12, wherein context comprises a credit entities context associated with a credit entities microservice for aggregating one or more related legal entities having common lines of credit.

14. The system of claim 11, wherein the set of domain software commands is associated with a respective collection of microservices further comprises at least one shared microservice for performing at least one task common to a plurality of contexts.

15. The system of claim 11, wherein the at least one processor, upon execution of the software instructions, is further configured to retrieve one or more user interface templates and one or more user interface functions associated with the context-specific UI components in response to the set of composite software commands.

16. The system of claim 11, wherein the at least one processor, upon execution of the software instructions, is further configured to generate financial projections based on microservice responses to each respective domain software command.

17. The system of claim 16, wherein the at least one processor, upon execution of the software instructions, is further configured to record, in an event log, the context-specific data associated with each respective microservice of a respective collection of microservices.

18. The system of claim 17, wherein the at least one processor, upon execution of the software instructions, is further configured to rebuild the financial projections based on the event log.

19. The system of claim 11, wherein the set of domain software commands is associated with at least one public microservice.

20. The system of claim 11, wherein the at least one processor, upon execution of the software instructions, is further configured to:
   generate a collection of context-specific UI components associated with the context of the UI; and
   instruct the at least one computing device to display the context-specific data using the collection of context-specific UI components in the context of the UI.

* * * * *